(12) United States Patent
Kikumoto et al.

(10) Patent No.: US 6,323,797 B1
(45) Date of Patent: Nov. 27, 2001

(54) WAVEFORM REPRODUCTION APPARATUS

(75) Inventors: Tadao Kikumoto, Shizuoka; Atsushi Hoshiai, Hannan; Satoshi Kusakabe, Hamamatsu, all of (JP)

(73) Assignee: Roland Corporation, Osaka (JP)

( * ) Notice: Subject to any disclaimer, the term of this patent is extended or adjusted under 35 U.S.C. 154(b) by 0 days.

(21) Appl. No.: 09/412,201

(22) Filed: Oct. 5, 1999

(30) Foreign Application Priority Data

Oct. 6, 1998 (JP) ................................................. 10-283670
Oct. 7, 1998 (JP) ................................................. 10-284858

(51) Int. Cl.⁷ ................................................. H03M 1/66
(52) U.S. Cl. ................................ 341/144; 84/604; 84/605
(58) Field of Search .................................... 708/122, 203, 708/315, 420, 421; 84/605, 607, 69; 341/144, 111

(56) References Cited

U.S. PATENT DOCUMENTS

| 3,946,504 | 3/1976 | Nakano | 35/35 |
|---|---|---|---|
| 4,805,217 | 2/1989 | Morihiro et al. | 381/35 |
| 4,876,937 | 10/1989 | Suzuki | 84/612 |
| 5,315,057 | 5/1994 | Land et al. | 84/601 |
| 5,347,478 | 9/1994 | Suzuki et al. | 364/715.02 |
| 5,412,152 | 5/1995 | Kageyama | 84/607 |
| 5,471,009 | 11/1995 | Oba et al. | 84/645 |
| 5,499,316 | 3/1996 | Sudoh et al. | 395/2.79 |
| 5,511,000 | 4/1996 | Kaloi et al. | 364/514 |
| 5,611,018 | 3/1997 | Tanaka et al. | 395/2.24 |
| 5,675,709 | 10/1997 | Chiba | 395/2.87 |
| 5,713,021 | 1/1998 | Kondo et al. | 395/614 |
| 5,717,818 | 2/1998 | Nejime et al. | 395/2.2 |
| 5,734,119 | 3/1998 | France et al. | 84/622 |
| 5,745,650 | 4/1998 | Otsuka et al. | 395/2.69 |
| 5,763,800 | 6/1998 | Rossum et al. | 84/603 |
| 5,765,129 | 6/1998 | Hyman et al. | 704/270 |
| 5,774,863 | 6/1998 | Okano et al. | 704/278 |
| 5,781,696 | 7/1998 | Oh et al. | 395/2.79 |
| 5,792,971 | 8/1998 | Timis et al. | 84/609 |
| 5,809,454 | 9/1998 | Okada et al. | 704/214 |
| 5,847,303 | 12/1998 | Matsumoto | 84/610 |
| 5,873,059 | 2/1999 | Iijima et al. | 704/207 |
| 5,886,278 | * 3/1999 | Yoshida | 84/604 |
| 6,169,240 | * 1/2001 | Suzuki | 84/605 |

* cited by examiner

*Primary Examiner*—Peguy Jeanpierre
*Assistant Examiner*—Jean Bruner Jeanglaude
(74) *Attorney, Agent, or Firm*—Foley & Lardner

(57) ABSTRACT

To make possible the smooth compression and expansion of an audio signal without directly culling out or repeating a prescribed segment of the audio signal, in other words, the waveform, by the use of a phase vocoder format and, together with this, making it possible to compress and expand an audio signal that has an abundance of changes. The system includes a storage device in which the data regarding the changes in the amplitude and the frequency of the waveform that accompany the passage of time are stored. The system also includes a time position data generator in which the time position data that indicate the time positions that change such that the time positions of the waveform retrace the passage of time are generated in order. The system also includes a waveform reproducer in which, from the storage means, the amplitude and the frequency data that correspond to the time position of the waveform that indicates the time position data that are generated by the time position data generating means are read out and a waveform that is based on said read out amplitude and frequency is output.

8 Claims, 18 Drawing Sheets

CROSS-FADING, EXPANSION BY MEANS OF REPETITION AND CULLING

COMPONENTS OF THE ORIGINAL AUDIO SIGNAL AND THE ANALYSIS BANDS

WAVEFORM REPRODUCTION APPARATUS

RELATED APPLICATION

The present invention relates to Japanese Patent Application No's. 283670 (filed Oct. 6, 1998) and 284858 (filed Oct. 7, 1998), which are incorporated herein by reference.

BACKGROUND OF THE INVENTION

1. Field of the Invention

The present invention is one that relates to a waveform reproduction apparatus and, in further detail, it relates to a waveform reproduction apparatus that has had the reproduction processing of the audio signal with which the waveform is expressed improved by means of a phase vocoder format.

2. Prior Art

In general, as a technology for the reproduction of an audio signal with which a waveform is expressed, for example, the temporal axis compression and expansion technology (hereafter, referred to as "time stretch technology" as the circumstances warrant) in which the reproduction time of the audio signal that has been recorded, in other words, the waveform, is compressed and expanded on the temporal axis, has come to be utilized in the music production field.

However, although by means of, for example, the making of the rotation speed of the tape in the tape recorder at the time of recording the tape and the rotation speed of the tape at the time of playing back the tape different, it has been possible to compress and expand the reproduction time of the audio signal that has been recorded on the tape on the temporal axis, there have been undesirable changes in the frequencies at the same time.

Because of this, in the time stretch technologies of the past, the audio signals are stored in order temporarily in such things as digital memory, a defined segment is detached and culled out as a segment or a defined segment is repeated and repeated as a segment and it is made so that the reproduction time is compressed and expanded on the temporal axis.

Incidentally, hereafter, the compression of the reproduction time on the temporal axis and the expansion of the reproduction time on the temporal axis will be abbreviated and referred to as "compression" and "expansion" as the circumstances warrant.

However, when an audio signal that is a continuous waveform is culled out or repeated, since the respective connection points become disconnected at the time of culling out or repetition, a new problem has arisen in that noise is generated.

Because of this, a technique has been proposed in which, by means of the cross-fading of the above mentioned connection points, the continuousness of the above mentioned connection points is preserved and the generation of noise is suppressed but it is not possible to completely prevent the fluctuation and rippling of the audio signal and this has not been a fundamental solution. (Incidentally, the meaning of "cross-fading" is a technique in which, at the time that a multiple number of waveforms that are continuous are reproduced, the reproduction is done so that the end section of a specific waveform (hereafter, referred to as the "first waveform") and the beginning section of a specific waveform that follows said waveform (hereafter, referred to as the "second waveform") are overlapped, the volume of the overlapping section of the first waveform is gradually decreased and, together with this, the volume of the overlapping section of the second waveform is gradually increased.) Incidentally, an example of the case in which cross-fading is carried out when a defined segment of an audio signal that has been returned to a waveform is detached, culled out as a segment and compressed is shown in FIG. 1(a). In addition, an example of a case in which cross-fading is carried out when a defined segment of the audio signal is repeated and repeated as a segment and expanded is shown in FIG. 1(b).

However, at the present time, a format known as the phase vocoder is being proposed as a time stretch technology in order to solve each of the above mentioned problem areas.

Here, a phase vocoder is something which is made so that the original audio signal, in other words, the original waveform, is divided into a multiple number of frequency band signals, by means of the analysis of the signals that have been divided in this way, the changes in the frequency and the changes in the amplitude that accompany the passage of time are acquired for each signal and, by means of the synthesis of each signal that has been compressed or expanded, the original signals are obtained as signals that have been compressed or expanded.

Accordingly, with the phase vocoder format, the amount of signal processing is enlarged but since there is no culling out or repetition of a defined segment of the audio signal, in other words, the waveform, as in the cross-fade format that was discussed previously, despite the compression and expansion of the reproduction time, there are no changes in the frequency and, moreover, it is possible to carry out the smooth compression and expansion of the reproduction time without noise or fluctuations.

A block structural diagram of one example of a publicly known phase vocoder is shown in FIG. 2. In addition, a block structural diagram is shown in FIG. 3 of a detailed illustration of the analysis section (band k analysis section) 400 of the band k that is in the phase vocoder that is shown in FIG. 2 (in the example that is shown in FIG. 2, k is an integer from 0 to 99). An explanation of the phase vocoder will be given below while referring to FIG. 2 and FIG. 3.

The phase vocoder is something in which the audio signal, in other words, the waveform, is divided into a multiple number of frequency bands that roughly have the bandwidth of the fundamental frequency (in the phase vocoder that is shown in FIG. 2, as is shown in FIG. 4, the frequency bands are divided into the 100 bands of band 0 to 99). In the analysis sections for each of the frequency bands that have been divided (in the phase vocoder that is shown in FIG. 2, these are the band 0 analysis section through the band 99 analysis section and, as mentioned above, the details of the band k analysis section are shown in FIG. 3), the audio signals of each of the frequency bands that have been divided are multiplied by the complex frequencies that are the center of the respective frequency bands and analyzed and expanded into the amplitude values and the momentary frequencies.

Here, w(n) in FIG. 3 is the impulse response of the analysis filter and the action of the band k analysis section is equal to the well known Fourier transform of the short segment that is detached in the w(n) window.

Then, the amplitude values and the instantaneous frequencies that have been obtained by the analysis of each of the frequency bands that have been divided are stored in the storage section.

The combination of each of the frequency bands that have been stored in the storage section in this manner with the audio signals that have been divided is carried out in the combining section, the sine waves of said center frequencies of each of the frequency bands that have been analyzed are modulated by the amplitude values and the instantaneous frequencies that have been analyzed, the audio signals of each said frequency band are generated and if the audio signals of each of the frequency bands that have been generated are mixed, the original audio signal is restored.

Here, in the case in which the reproduction time of the audio signal is compressed and expanded, time and frequency conversion processing with which the interpolation value of the amplitude value and the interpolation value of the instantaneous frequency are sought is carried out in the conversion section.

A block structural diagram of the band k conversion section for the execution of the time and frequency conversion processing related to band k is shown in FIG. 5(a). An explanation regarding the processing in the case where the reproduction time of the audio signal is compressed and expanded will be given while referring to FIG. 5(a).

First, in the case in which the reproduction time of the audio signal is expanded, the amplitude values at each of the sample points in the conversion section are interpolated, the amplitude value envelope is enlarged based on the temporal expansion data and, in addition, the interpolation values of the sample points are sought for the instantaneous frequency also (refer to FIG. 5(b)). Then, from the amplitude values and the instantaneous frequencies that have been obtained by means of the interpolation in this way, in the same manner as mentioned above, each of the audio signals of the frequency bands that have been divided is derived in the combination section and mixing is done.

On the other hand, in the case in which the reproduction time of the audio signal is compressed, the amplitude values and the instantaneous frequencies are culled out by interpolation and the envelope is compressed (refer to FIG. 5(c)). Then, from the amplitude values and the instantaneous frequencies that have been obtained by means of the interpolation in this way, in the same manner as mentioned above, each of the audio signals of the frequency bands that have been divided is derived in the combination section and mixing is done.

Incidentally, in the case where the pitch of the audio signal is modulated, the harmony between the center frequencies of each of the frequency bands that have been divided is multiplied by the proportion of the change and the above mentioned interpolation operations may be executed.

In addition, since the processing that has been described above is executed by means of publicly known techniques, a flow chart as well a detailed explanation will be omitted.

However, in the above mentioned phase vocoder format, since the compression and expansion of the audio signal, in other words, the waveform, is achieved simply by the expansion or the compression of the envelopes that denote the respective time changes of the amplitude values which are the amplitude data and the instantaneous frequencies which are the frequency data, there have been problems in that it is not possible to carry out the compression and expansion of an audio signal that has an abundance of changes.

In addition, in the phase vocoder, there often are cases where the original tone (the original audio signal) is faithfully reproduced but, in those cases, together with compression and expansion on the temporal axis not being carried out, the reproduction is done without making any changes in the pitch (hereafter, "together with compression and expansion on the temporal axis not being carried out, the reproduction is done without making any changes in the pitch" is referred to a "one-to-one reproduction" as the circumstances warrant).

However, in the phase vocoder fornat that is mentioned above, there is no phase data and, in addition, since no means has been established in which to set the phase value in the cosine oscillator at the time of the start of the reproduction, when the reproduction is carried out, a suitable arbitrary phase value is set and the reproduction is begun.

Because of this, even if a one-to-one reproduction is carried out, the phase value is, in general, different from that of the original tone and there has been the problem that a sound is reproduced that differs from the original tone. In other words, even in those cases where a one-to-one reproduction is carried out, there has been a problem that it is not possible to faithfully reproduce the original tone.

3. Problem of Prior Art to be Addressed

The present invention is one that was done taking into account the problem areas that are inherent in the technology of the past such as those mentioned above. In order to achieve that objective, a waveform reproduction apparatus is presented in which the smooth compression or expansion of an audio signal is possible without a particular segment of the audio signal, in other words, the waveform, being directly culled out or repeated by means of the utilization of a phase vocoder format and, together with this, it is possible to carry out the compression and expansion of an audio signal that has an abundance of changes.

MEASURES TO SOLVE THE PROBLEM

Figure 1:
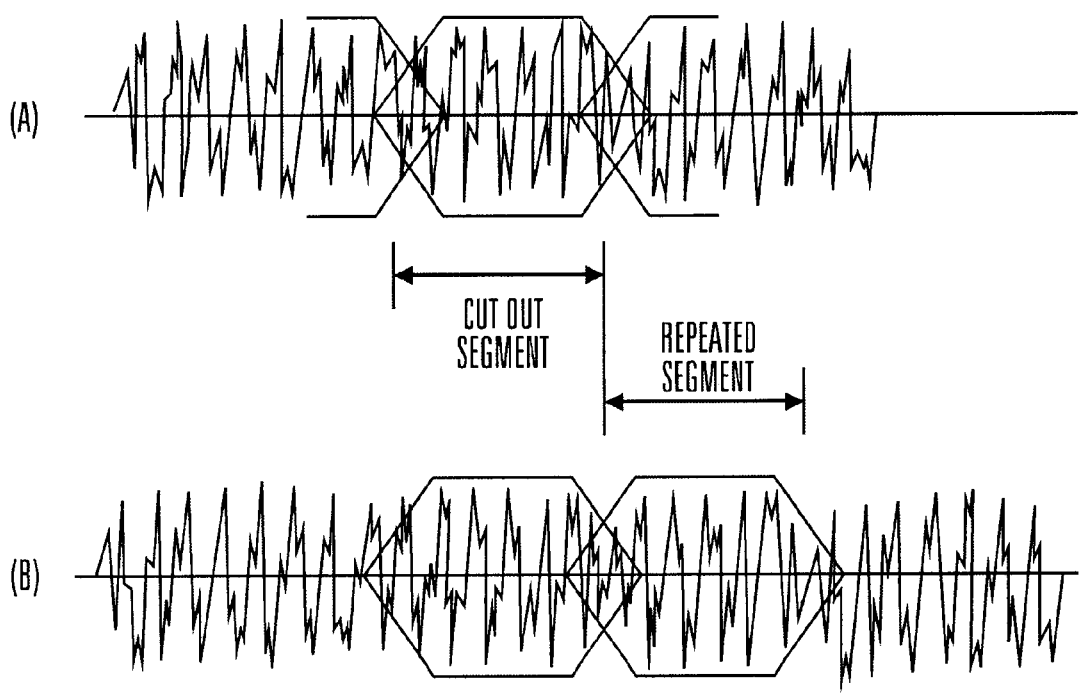
FIG. 1: (a) is an explanatory diagram of the waveform that shows an example of the case in which cross-fading is carried out at the time that a defined segment of the audio signal that is displayed as a waveform is cut out, culled as a segment and compressed; and (b) is an explanatory diagram of a waveform that shows an example of the case where cross-fading is carried out at the time that a defined segment of the audio signal is repeated and repeated as a segment and expanded.

In order to achieve the above mentioned objective, the waveform reproduction apparatus in accordance with the present invention is one that applies audio signal, in other words, waveform, compression and expansion by means of a phase vocoder format and is made so that, when the audio signal is compressed and expanded, the reproduction time of the audio signal is compressed and expanded while the reproduction phase of the audio signal is made to advance in the reverse direction so as to retrace the passage of time.

In other words, the invention that is cited in claim 1 of the present invention is one that is made so that it has a storage means in which the data regarding the changes in the amplitude and the frequency of the waveform that accompany the passage of time are stored and a time position data generating means in which the time position data that indicate the time positions that change such that the time positions of the waveform retrace the passage of time are generated in order and a waveform reproduction means in which, from the above mentioned storage means, the amplitude and the frequency data that correspond to the time position of the waveform that indicates the time position data that are generated by the above mentioned time position data generating means are read out and a waveform that is based on said read out amplitude and frequency is output.

In addition, the invention that is cited in claim 2 of the present invention has, in the invention that is cited in Claim 1 of the present invention, in addition, a setting means in which the changing speed is set such that the time positions that are indicated by the time position data that are generated by the above mentioned time position data generating means retrace the passage of time.

Furthermore, in order to achieve the above mentioned objective, the waveform reproduction apparatus in accordance with the present invention is one that applies audio signal, in other words, waveform, compression and expansion by means of a phase vocoder format and is made so that, when the audio signal is compressed and expanded, the reproduction time of the audio signal is compressed and expanded while the reproduction phase of the audio signal is made to swing.

Here, the "swing" of the audio signal, in other words, the waveform, means that, for example, together with the changing of the reproduction position of the audio signal, the reproduction direction (direction on the temporal axis) is also changed so that the reproduction of the audio signal is made to reciprocate in the interval of a specified segment.

Accordingly, the invention that is cited claim 3 of the present invention is one that is made so that it has a storage means in which the data regarding the changes in the amplitude and the frequency of the waveform that accompany the passage of time are stored and a time position data generating means in which the time position data that indicate the time positions of the waveform are generated in order and a waveform reproduction means in which, from the above mentioned storage means, the amplitude and the frequency data that correspond to the time position of the waveform that indicates the time position data that are generated by the above mentioned time position data generating means are read out and a waveform that is based on said read out amplitude and frequency is output and a control means which is a control means that controls the changing of the time position data that are generated by the above mentioned time position data generating means and with which said time position data are changed such that they swing within a prescribed range.

In addition, the invention that is cited in claim 4 of the present invention is one in which, in the invention that is cited in claim 3 of the present invention, the above mentioned storage means stores the segment data that indicate the temporal segment of the waveform and the above mentioned control means is one in which the shifting of the time position data temporally in the forward direction and in the reverse direction is repeated in the segment that is indicated by the segment data that have been stored in the above mentioned storage means.

Furthermore, also, in order to achieve the above mentioned objective, the waveform reproduction apparatus in accordance with the present invention is one that applies audio signal, in other words, waveform, compression and expansion by means of a phase vocoder format and is made so that, when the audio signal is compressed and expanded, it is provided with the phase data and made possible to reproduce the waveform based on said phase and, moreover, the reproduction time of the audio signal is compressed and expanded while the reproduction phase of the audio signal is made to advance in the reverse direction so as to retrace the passage of time.

In other words, the invention that is cited in claim 5 of the present invention is one that is made so that it has a storage means in which the data regarding the changes in the amplitude and the phase of the waveform that accompany the passage of time are stored and a time position data generating means in which the time position data that indicate the time positions that change such that the time positions of the waveform retrace the passage of time are generated in order and a waveform reproduction means in which, from the above mentioned storage means, the amplitude and the phase data that correspond to the time position of the waveform that indicates the time position data that are generated by the above mentioned time position data generating means are read out and a waveform that is based on said read out amplitude and phase is output.

In addition, the invention that is cited in claim 6 of the present invention has, in the invention that is cited in claim 5 of the present invention, in addition, a setting means in which the changing speed is set such that the time positions that are indicated by the time position data that are generated by the above mentioned time position data generating means retrace the passage of time.

Furthermore, in order to achieve the above mentioned objective, the waveform reproduction apparatus in accordance with the present invention is one that applies audio signal, in other words, waveform, compression and expansion by means of a phase vocoder format and is made so that, when the audio signal is compressed and expanded, it is provided with the phase data and made possible to reproduce the waveform based on said phase and, moreover, the reproduction time of the audio signal is compressed and expanded while the reproduction phase of the audio signal is made to swing.

Here, the "swing" of the audio signal, in other words, the waveform, means that, as mentioned above, for example, together with the changing of the reproduction position of the audio signal, the reproduction direction (direction on the temporal axis) is also changed so that the reproduction of the audio signal is made to reciprocate in the interval of a specified segment.

Accordingly, the invention that is cited in claim 7 of the present invention is one that is made so that it has a storage means in which the data regarding the changes in the amplitude and the phase of the waveform that accompany the passage of time are stored and a time position data generating means in which the time position data that indicate the time positions of the waveform are generated in order and a waveform reproduction means in which, from the above mentioned storage means, the amplitude and the phase data that correspond to the time position of the waveform that indicates the time position data that are generated by the above mentioned time position data generating means are read out and a waveform that is based on said read out amplitude and phase is output and a control means which is a control means that controls the changing of the time position data that are generated by the above mentioned time position data generating means and with which said time position data are changed such that they swing within a prescribed range.

In addition, the invention that is cited in claim 4 [sic, should be 8] of the present invention is one in which, in the invention that is cited in claim 3 [sic, should be 7] of the present invention, the above mentioned storage means stores the segment data that indicate the temporal segment of the waveform and the above mentioned control means is one in which the shifting of the time position data temporally in the forward direction and in the reverse direction is repeated in the segment that is indicated by the segment data that have been stored in the above mentioned storage means.

PREFERRED EMBODIMENTS OF THE INVENTION

A detailed explanation will be given below of one example of the preferred embodiments of the waveform reproduction apparatus in accordance with the present invention while referring to the appended figures.

1. Description of the First Preferred Embodiment

Figure 6:
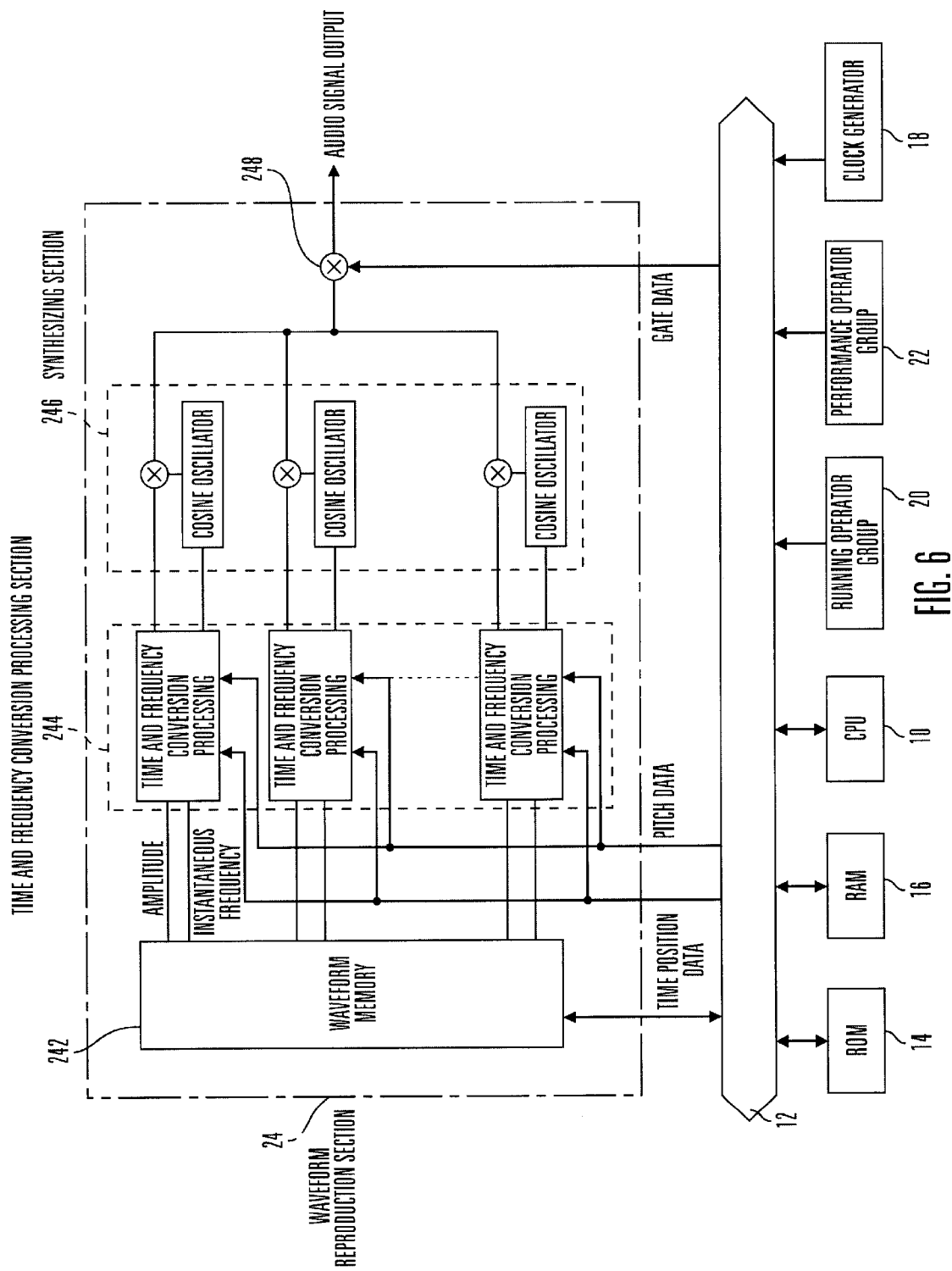
FIG. 6: A block structural diagram of the hardware for the realization of an example of a preferred embodiment of the waveform reproduction apparatus in accordance with the present invention.

A block structural diagram of the hardware for the realization of the first preferred embodiment of the waveform reproduction apparatus in accordance with the present invention is shown in FIG. 6.

In other words, this waveform reproduction apparatus is one in which the control of the entire operation is carried out by the central processing unit (CPU) 10. The read only memory (ROM) 14, the random access memory (RAM) 16, the clock generator 18, the running operator group 20, the performance operator group 22 and the waveform reproduction section 24 are connected to the CPU 10 through the bus 12.

Next, a detailed explanation will be given of each of the above mentioned structural elements that comprise the waveform reproduction apparatus.

First, the CPU 10 carries out the control of each kind of process in conformance with the operation of each of the operators that comprise the running operator group 20 and, together with this carries out the control of the processing in the waveform reproduction section 24. Incidentally, as will be discussed later, the clock signal that is generated by the clock generator 18 is input into the CPU 10 and, by means of the insertion processing that is carried out for each clock, synchronization of the processing is accomplished with the waveform reproduction section 24.

In addition, the ROM 14 is the memory that stores the program that is executed by the CPU 10.

Furthermore, the RAM 16 is the memory in which the multiple number of waveform information items (incidentally, "waveform information" will be discussed later) that correspond to the multiple number of varieties of waveforms for the audio signals as well as the variables for the processes in the CPU 10 or the values of each of the various parameters that are set by the processes of the CPU 10 is stored.

In addition, the clock generator 18 generates the clock signal of the frequency that is equal to the sampling frequency of the waveform data (incidentally, "waveform data" will be discussed later) that are to be reproduced. For example, if the sampling frequency of the waveform data is 44.1 kHz, the clock generator 18 generates a clock signal that is at a rate of 44,100 per second.

Here, the clock signal is supplied to the CPU 10 and the waveform reproduction section 24 and the processing is synchronized mutually for the CPU 10 and the waveform reproduction section 24 by the clock signal.

In addition, the running operator group 20 comprises the various kinds of running operators such as the waveform selection buttons that carry out the selection of the waveforms that are to be reproduced in the waveform reproduction apparatus as well the mode selection buttons that select the operating modes (incidentally, the "operating modes" will be discussed later) in the waveform reproduction apparatus.

Figure 7:
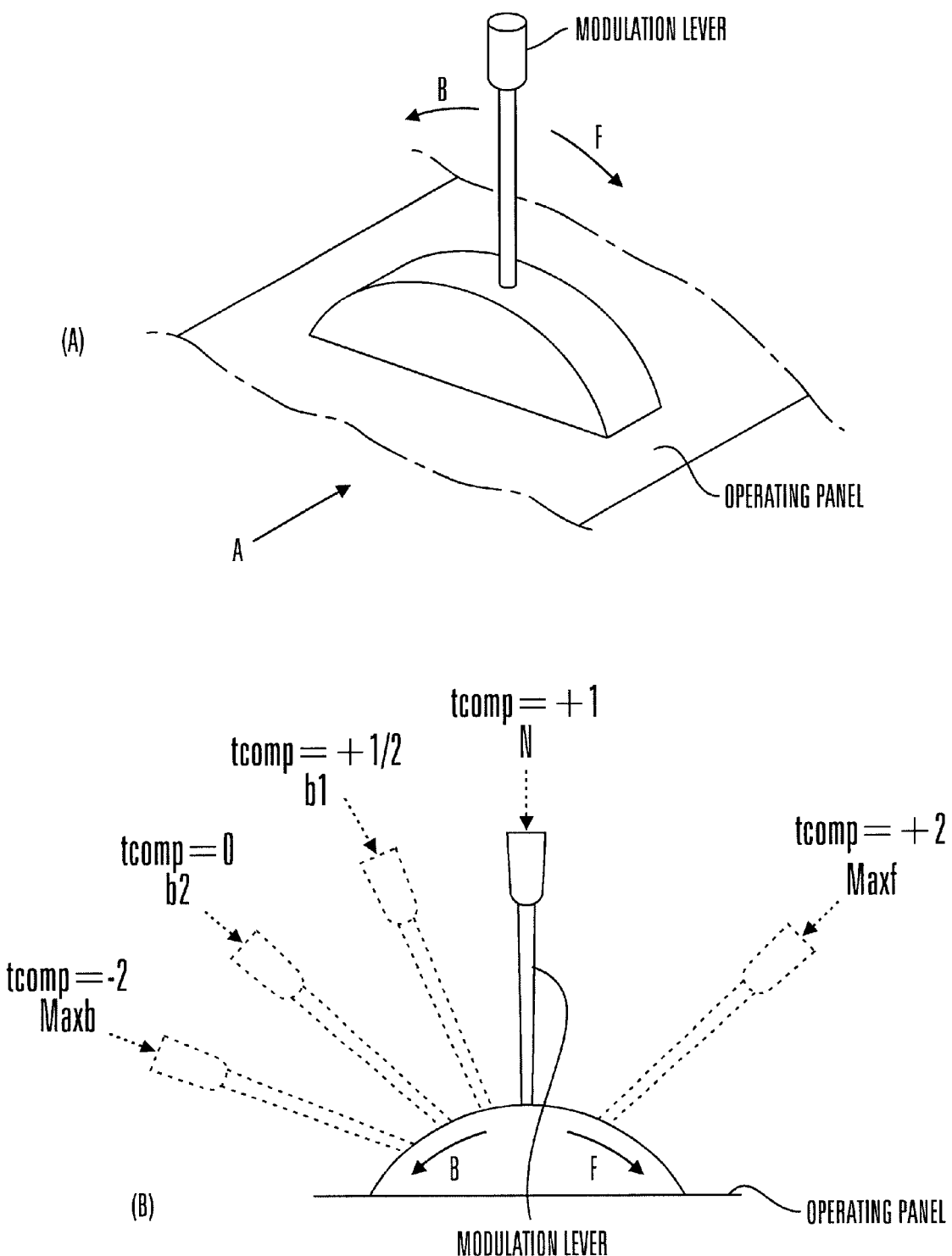
FIG. 7: (a) is an oblique outline diagram of a modulation lever, and (b) is a sagittal view of (a).

Furthermore, the performance operator group 22 comprises the various kinds of performance operators such as the keyboard that is composed of a multiple number of keys for carrying out the performance operation by means of the pressing and releasing of the appropriate keys and the modulation levers (refer to FIGS. 7(*a*) and (*b*)) for setting the modulation which will be discussed later.

Here, when the keyboard performance is carried out, the performance data that indicate the appropriate performance operations are sent to the CPU 10. In other words, at the time that a key of the keyboard is pressed, the Note On data (tone generation data) that contains the note number data which express the note number that is the pitch that corresponds to the key that has been pressed are sent to the CPU 10. In addition, at the time that the of the keyboard is released, the Note Off data (tone cancelation data) that contain the note number data which express the note number that is the pitch that corresponds to the key that has been released are sent to the CPU 10.

In addition, the modulation lever is, as is shown in FIGS. 7(a) and (b), established on the running operator group 20 and the operation panel that arranges the keyboard and, with the neutral position N that is perpendicular to the operation panel as the center, a swinging operation in the arrow F direction as well as in the arrow B direction is possible by means of a hand movement operation. When the modulation lever that is configured in this manner is operated, the modulation data, which are the data that indicate the amount that the modulation lever has been operated, are sent as performance data to the CPU 10.

Incidentally, for the modulation lever, a swinging operation in the arrow F direction as well as in the arrow B direction is possible by means of a hand movement operation as described above. However, an automatic return mechanism (not shown in the figure) is incorporated that is constructed with a publicly known spring mechanism, etc. so that, when the hand movement operation is cancelled, it automatically returns to the neutral position N.

In addition, the waveform reproduction section 24 is equipped with the waveform memory 242, the time and frequency conversion processing section 244, the combining section 246 and the gate 248. The waveform reproduction section 24, which is configured in this manner, reads out the waveform data from the waveform memory 242 and carries out the waveform reproduction based on the control of the CPU 10. Incidentally, as described above, the waveform reproduction section 24 is synchronized with the clock signal that is generated by the clock generator 18 and, by means of this action, it is synchronized with the processing of the CPU 10.

Next, a detailed explanation will be given concerning each of the structural elements that compose the waveform reproduction section 24.

First, the waveform memory 242 is memory that stores the respective waveform data for each of the frequency bands. The waveform data that are stored by the waveform memory 242 are transferred from the RAM 16 under the control of the CPU 10.

Figure 2:
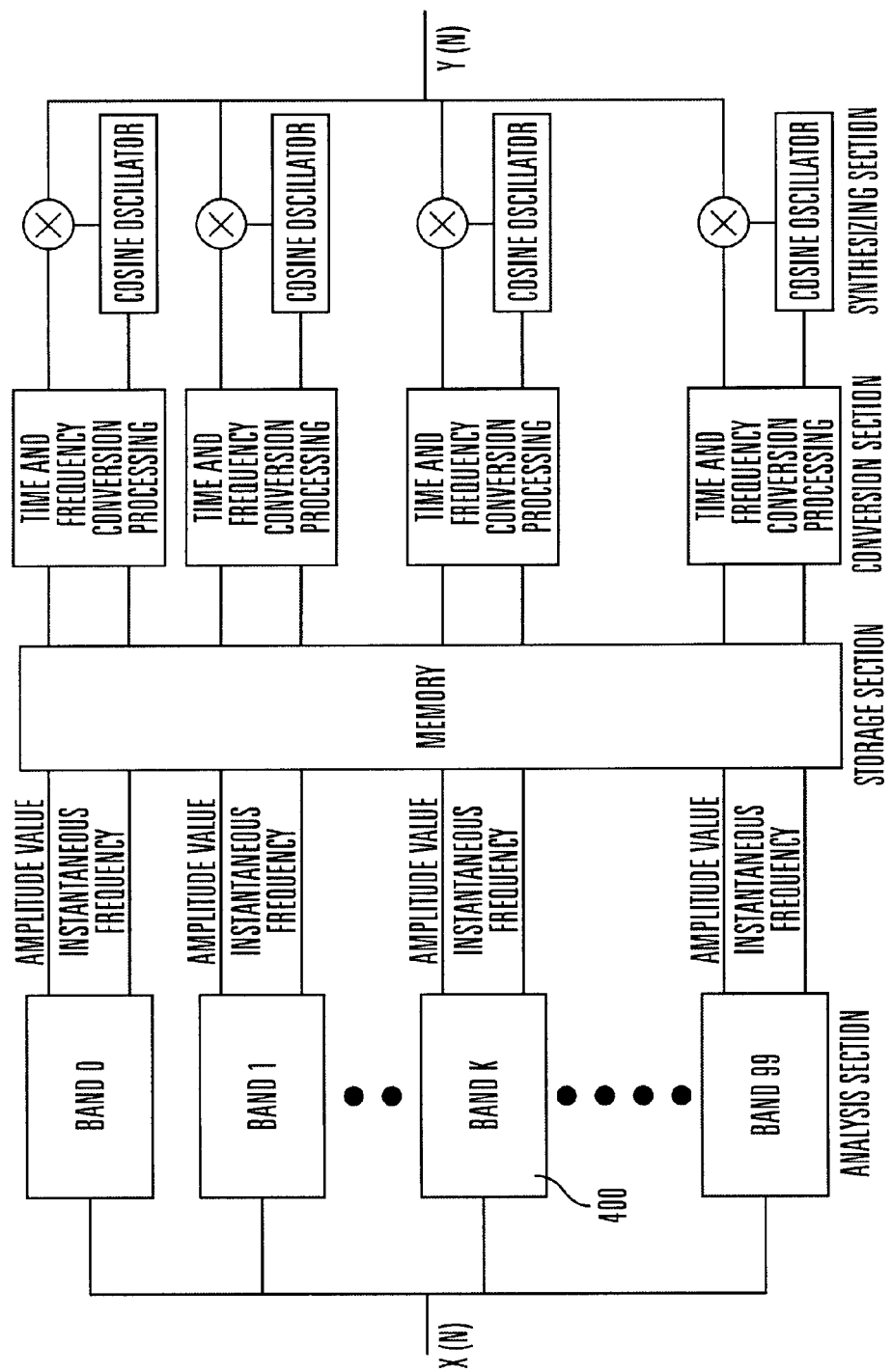
FIG. 2: A block structural diagram that shows an example of a publicly known phase vocoder.
Figure 5:
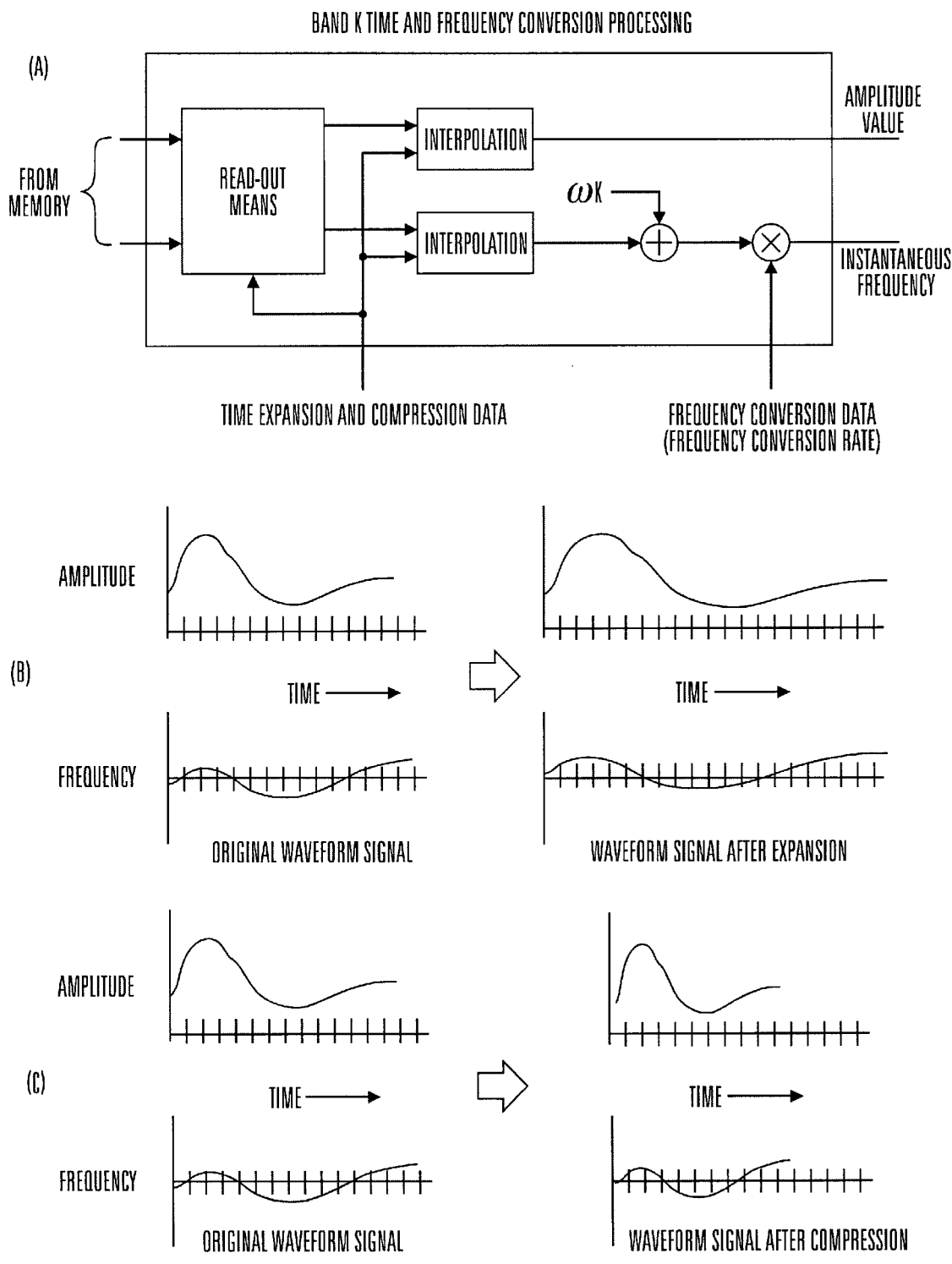
FIG. 5: (a) is a block structural diagram that shows an example of the detailed structure of the band k conversion section for the execution of the time and frequency conversion processing related to band k, (b) is an explanatory diagram of a waveform that shows the case where the reproduction time of the waveform signal is expanded, and (c) is an explanatory diagram of a waveform that shows the case where the reproduction time of the waveform signal is compressed.

In addition, the time and frequency conversion processing section 244 is equivalent to the conversion section of the phase vocoder of the past that is shown in FIG. 2 and carries out time conversion and pitch conversion for each frequency band. For each frequency band, the time and frequency conversion processing section 244 is synchronized with the clock signal that is generated by the clock generator 18, reads out the waveform data from the waveform memory 242 in accordance with the time position data (incidentally, the "time position data" will be discussed later) from the CPU 10 at each clock and the amplitude data (incidentally, the "amplitude data" will be discussed later) and the instantaneous frequency data (incidentally, the "instantaneous frequency data" will be discussed later) of the waveform data are sent to the combining section 246. Incidentally, the instantaneous frequency data that have been read out have the center frequency of that frequency band added, the pitch data from the CPU 10 are further multiplied with said addition result as the frequency conversion rate and sent to the conversion section as the instantaneous frequency data following conversion (refer to FIG. 5(a)).

In addition, the combining section 246 is equivalent to the combining section of the phase vocoder of the past that is shown in FIG. 2 and, from the respective amplitude data and instantaneous frequency data for each frequency band, the waveforms for each frequency band are generated, the waveforms for each of the frequency bands are added and the audio signals are output. At this time, the cosine oscillator outputs a sine wave at the frequency that corresponds to the instantaneous frequency data and the amplitude of said sine wave is controlled by the amplitude data.

In addition, the gate 248 passes the audio signal from the combiner section 246 unchanged or mutes it by means of the gain control. When a "1" is sent from the CPU 10 as the gate data, the audio signal is passed and, on the other hand, when a "0" is sent from the CPU 10 as the gate data, the amplitude of the audio signal is made zero and it is muted.

Next, a detailed explanation will be given concerning the waveform information that is stored in the RAM 16. The waveform information is comprised of the waveform data, which are the data that express the waveform as an audio signal and each kind of data that are required when the waveform data are read out (specifically, these are the alternate starting point data, Alt S, the alternate ending point data, Alt E, the wave end data, Wave End, and the basic note number, Note #). A detailed explanation will be given below concerning the waveform data and each kind of data that is required when the waveform data are read out.

First, an explanation will be given regarding the waveform data. The waveform data are data that express the waveforms of each of the frequency bands. Accordingly, the respective waveform data exist in each of the frequency bands and the waveform data of band 0 through the waveform data of band 99 are combined in parallel temporally, forming the audio.

The waveform data that are configured in this manner are composed of the amplitude data, which are the data that express the shift in the amplitude of the waveform, and the instantaneous frequency data, which are the data that express the shifts in the instantaneous frequency that accompany the passage of time and are expressed as follows.

| Band 0 amplitude data | Amp (0, addr) |
|---|---|
| Band 0 instantaneous frequency data | Freq (0, addr) |
| Band 1 amplitude data | Amp (1,addr) |
| Band 1 instantaneous frequency data | Freq (1, addr) |
| Band k amplitude data | Amp (k, addr) |
| Band k instantaneous frequency data | Freq (k, addr) |
| Band 99 amplitude data | Amp (99, addr) |
| Band 99 instantaneous frequency data | Freq (99, addr) |

Here, "addr" is the address which is 0 for the beginning of the waveform data and is the data that express the time position of the waveform. The temporal axis of the waveform data for each band can, by being made common with the unit of the addr, be made to be in agreement with it.

Next an explanation will be given regarding the alternate starting point data Alt S and the alternate ending point data Alt E. The alternate starting point data Alt S as well as the alternate ending point data Alt E are things that are used in the alternate reproduction mode that will be discussed later.

Here, the alternate reproduction mode is an operating mode in which the time position in which the shifting of the waveform is reproduced is controlled automatically so that it reciprocates in a prescribed segment, the entities that indicate the starting point of the prescribed segment are the alternate starting point data Alt S and, in addition, the entities that indicate the ending point of the prescribed segment are the alternate ending point data Alt E. Also, the time positions of the starting point and ending point in the alternate starting point data Alt S and the alternate ending point data Alt E are indicated by the respective addr values.

Figure 8:
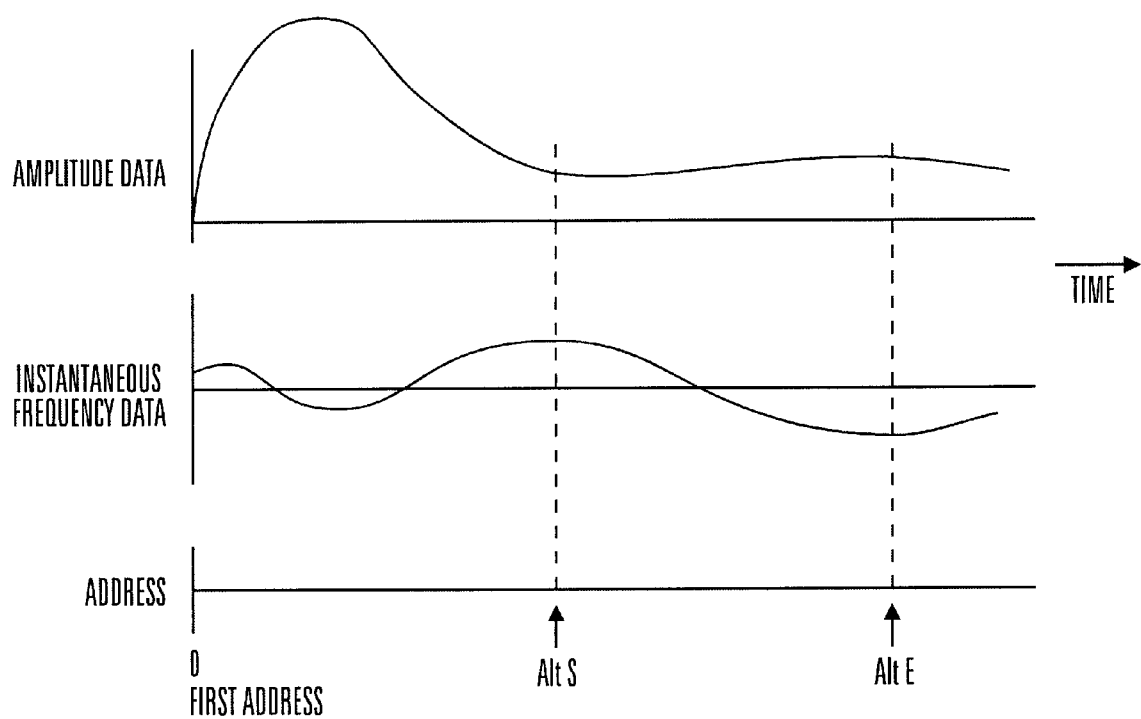
FIG. 8: An explanatory diagram of a waveform that shows an illustration of the settings of the alternate starting point data Alt S and the alternate ending point data Alt E.

An illustration of the settings of the alternate starting point data Alt S and the alternate ending point data Alt E is shown in FIG. 8. In this illustration, the amount of one cycle for the change of the instantaneous frequency or, if put in other words, the amount of one vibrato cycle, is set as the alternate starting point data Alt S and the alternate ending point data Alt E.

Figure 14:
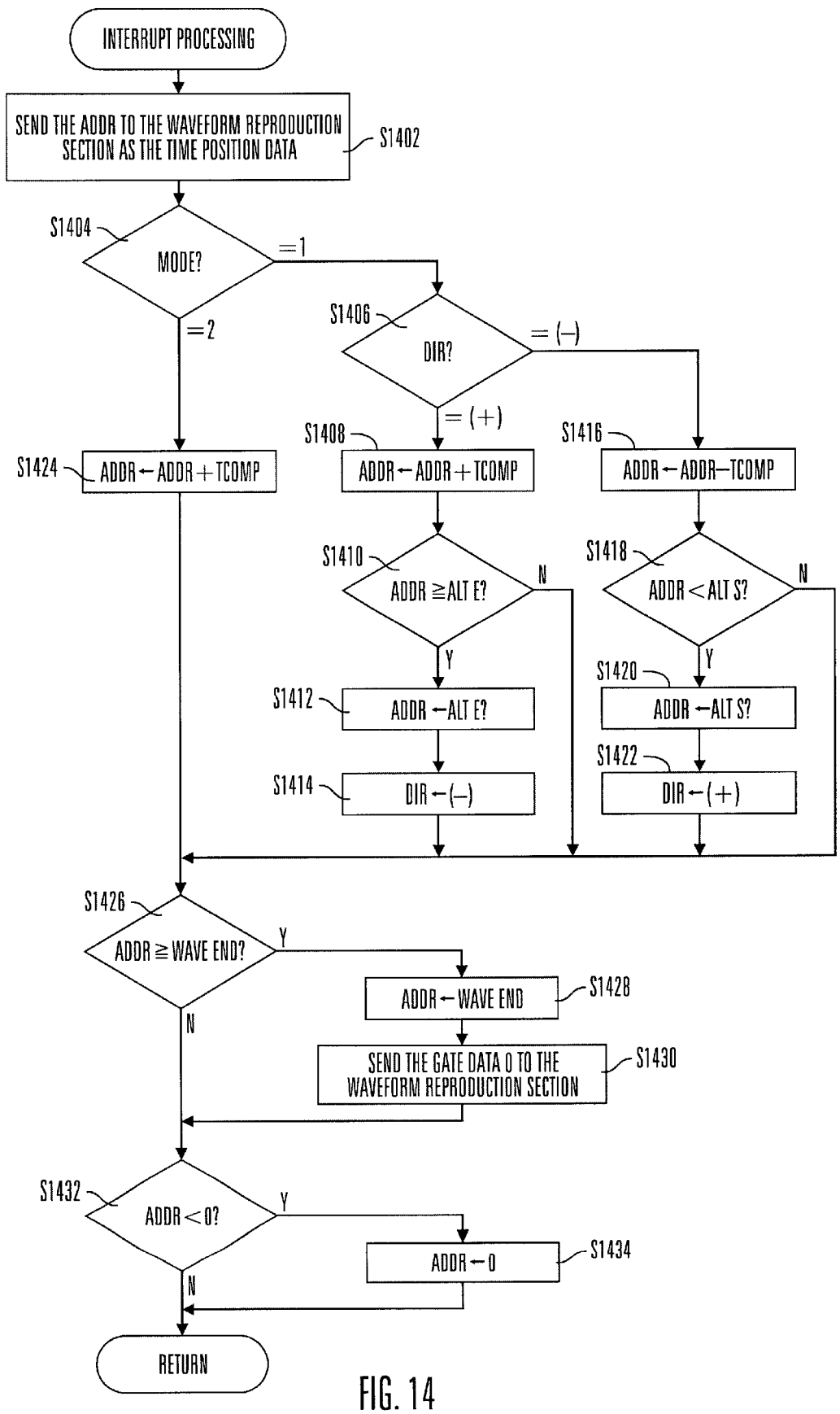
FIG. 14: A flowchart that shows the insertion processing routine.

In the alternate reproduction mode, the time position of the waveform reproduction is in the manner of the "Alt S-Alt E-Alt S-Alt E- . . . " of the insertion processing routine that will be discussed later (FIG. 14). In other words, by means of the swinging, the instantaneous frequency, that is to say, the reproduced pitch is made to change smoothly, a vibrato reproduction that gives full play to the key elements of the vibrato that are possessed by the original waveform becomes possible to achieve and the compression and expansion of a waveform that has an abundance of changes can be carried out.

In addition, the waveform ending data Wave End are entities that are indicated by the addr value for the time position of the waveform data ending.

Furthermore, the basic note number Note # indicates the note number (pitch) that becomes the base at the time that the pitch changes and is reproduced. With regard to the note numbers that are designated by the pressing and releasing of the keys of the keyboard, the amount of pitch change is determined based on the deviation from said basic note number.

An explanation will be given of the processing in the CPU 10 in the above configuration while referring to the flow charts that are shown in FIG. 9 through FIG. 14.

First, to start with, an explanation will be given regarding the principal items from among the variables that are used in the processing that is shown in the flow charts of FIG. 9 through FIG. 14.

MODE

This is a variable that expresses the operating mode of the waveform reproduction apparatus. When it is "MODE=1," this indicates the alternate reproduction mode as the operating mode and when it is "MODE=2," this indicates the manual operating mode.

In addition, the alternate reproduction mode is a mode in which the control of the shifting of the time position of the waveform reproduction is carried out so that it reciprocates in the prescribed segment that is indicated by the starting point and ending point which are expressed by the alternate starting point data Alt S and the alternate ending point data Alt E.

Furthermore, the manual reproduction mode is a mode in which the change of the time position of the waveform reproduction by the operation of the modulation lever that is comprised by the performance operator group 22, in other words, the speed of the waveform reproduction, is controlled including the forward and reverse of the advance direction.

GATE

"GATE=1" is set when the Note On data are input by pressing the keys of the keyboard and the sound generation is begun and the "GATE=0" is set when the Note Off data are input by releasing the keys of the keyboard and the sound generation is terminated. The current state of the sound generation control is indicated by this means.

addr

This is the variable that expresses the value of the address of the waveform data and it indicates the time position of the waveform reproduction.

tcomp

This is the variable that expresses the amount that the addr which indicates the time position is advanced, or if put in other terms, the speed of the waveform reproduction. In other words, in the alternate reproduction mode, the addr is increased or decreased by tcomp only each clock and in addition, in the manual reproduction mode, tcomp includes the forward and reverse of the time advance and tcomp is added to the addr for each clock. Accordingly, since, in the case where "tcomp=0," the addr is not advanced, the reproduction position does not change at the time of the reproduction of the waveform and the audio continues during the sound generation without changing.

Here, tcomp is determined by the modulation data that indicate the amount of operation of the modulation lever.

However, when the modulation lever is operated by a hand movement in the arrow F direction, it is able to swing up to the maximum front position Max f and, in addition, when it is operated by a hand movement in the arrow B direction, it passes through the position b1 and the position b2 and is able to swing up to the maximum back position Max b (refer to FIG. 7(b)).

In addition, it is set up so that when the modulation lever is placed in the neutral position N, "tcomp=+1" is set and so that when the modulation lever has advanced from the neutral position N in the arrow B direction and is placed in the position b1, "tcomp=+(½)" is set. It is set up so that when the modulation lever has advanced from the neutral position N in the arrow B direction and is placed in the position b2, "tcomp=0" is set and when the modulation lever is placed in the maximum back position Max b, "tcomp=−2" is set. Also, when the modulation lever is placed in the maximum front position Max f, "tcomp=+2" is set.

Figure 13:
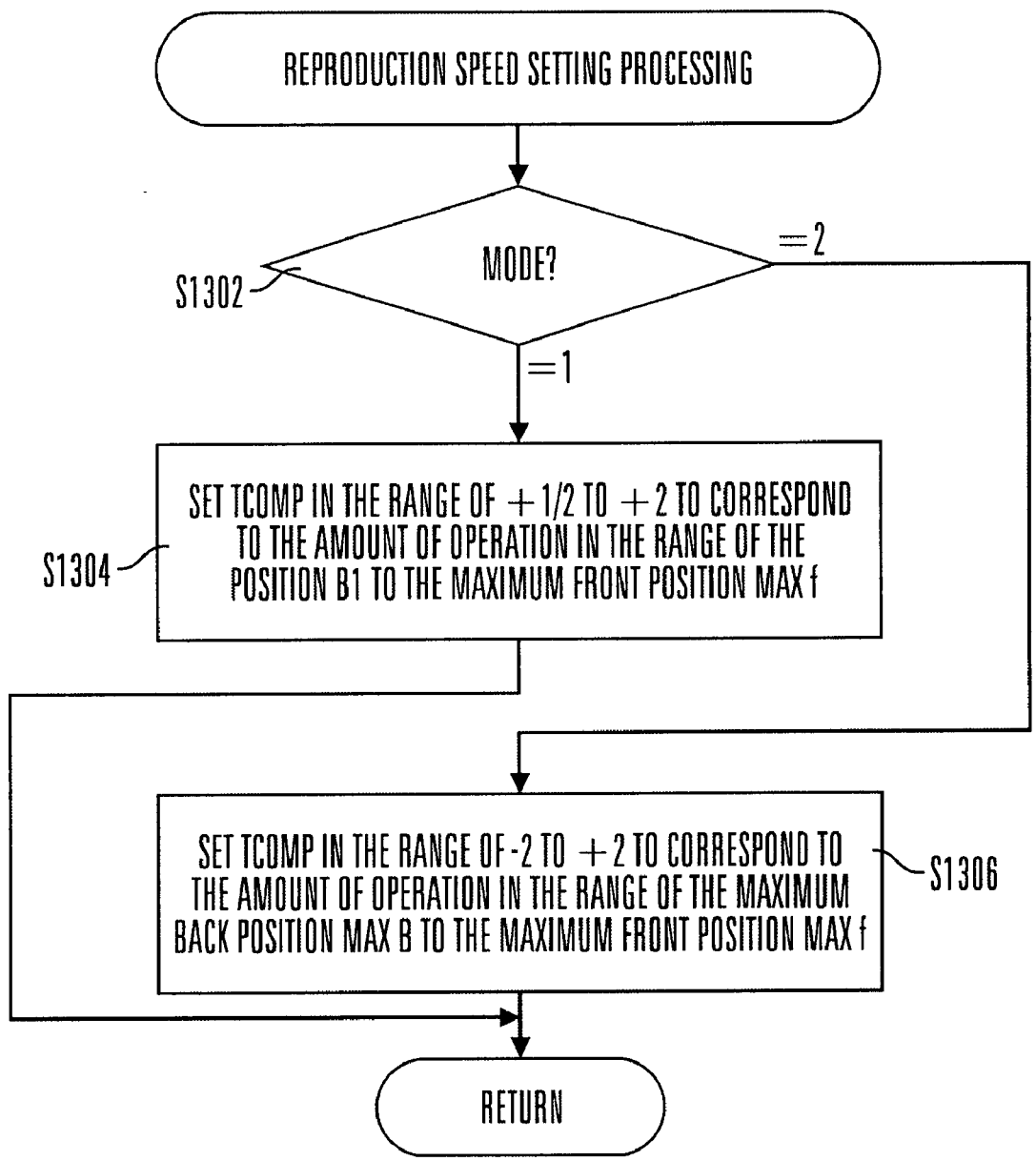
FIG. 13: A flowchart that shows the reproduction speed setting processing routine.

Incidentally, in the case where "MODE=1 (alternate reproduction mode)," the range of swinging operation of the modulation lever is restricted to the range from the position b1 to the maximum front position Max f and it is arranged so that the tcomp value is set as a proportional part of the range of "tcomp=+(½) through tcomp=+2," corresponding to the amount of operation of the modulation lever in the range of "position b1 through the maximum front position Max f" (refer to step S1304 of FIG. 13).

In addition, in the case where "MODE=2 (manual reproduction mode)," the range of the swinging operation of the modulation lever is restricted to the range from the maximum back position Max b to the maximum front position Max f and it is arranged so that the tcomp value is set as a proportional part of the range of "tcomp=−2 through tcomp=+2," corresponding to the amount of operation of the modulation lever in the range of "the maximum back position Max b through the maximum front position Max f" (refer to step S1306 of FIG. 13).

dir

In the alternate reproduction mode, the addr that indicates the time position may be increased with each tcomp or the addr that indicates the time position may be reduced with each tcomp. In other words, it is a variable that indicates the reproduction direction. If it is "dir=(+)," this indicates that the addr that indicates the time position is increased with each tcomp and the waveform reproduction is carried out in the forward direction, in other words, following the temporal order of the waveform data. On the other hand, if it is "dir=(−)," this indicates that the addr that indicates the time position is decreased with each tcomp and the waveform reproduction is carried out in the reverse direction, in other words, the opposite of the temporal order so that the waveform data retrace the passage of time.

Figure 9:
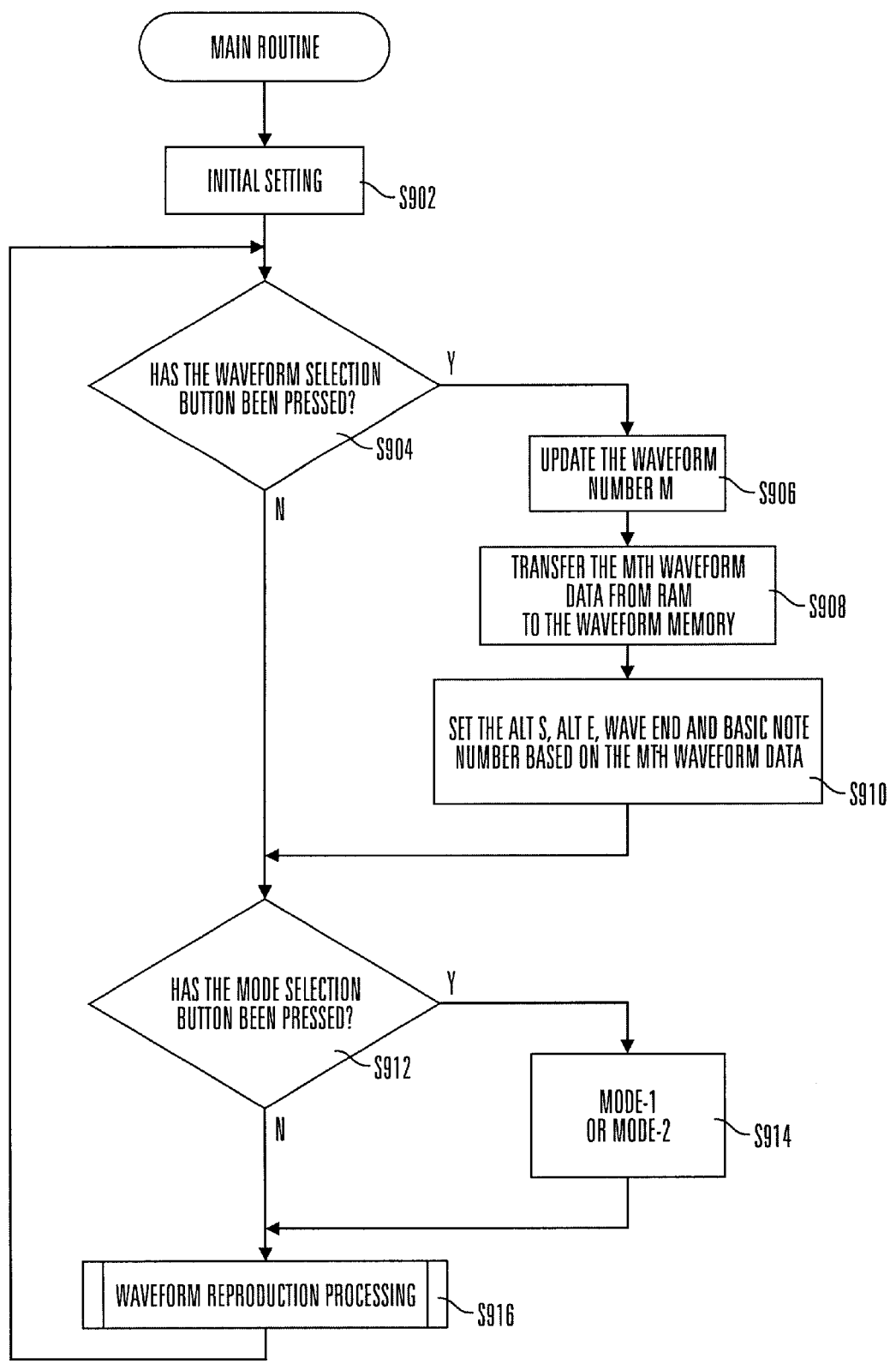
FIG. 9: A flowchart that shows the main routine.

A flowchart of the main routine of this waveform reproduction apparatus is shown in FIG. 9. When the power is input into the waveform reproduction apparatus, the main routine is launched and is repeated and executed at high speed until the power is cut off.

In the main routine, first, the processing of the initial settings is carried out in Step S902. In this initial setting processing, together with carrying out the initialization of the main unit of the apparatus, MODE is initialized to "1," GATE is initialized to "0" and, in addition, the reproduced waveform is initialized to the initial value of the specified waveform number M.

When the processing of Step S902 is finished, the processing related to the waveform selection button is carried out in Step S904 through Step S910.

In other words, in Step S904, a determination is made as to whether the waveform selection button has been pressed and, in the case where it has been determined in Step S904 that the waveform selection button has been pressed, the waveform number M that indicates the waveform is changed to correspond to the waveform selection button that has been pressed (Step S906), the Mth waveform data are transmitted from the RAM 16 to the memory 242 (Step S908 and, in addition, the alternate starting point data Alt S, the alternate ending point data Alt E, the waveform ending data Wave E and and the basic note number Note # are set in the registers that have been established in the working memory region of the RAM 16 as the parameters that are used in the flowchart based on the Mth waveform data (Step S910).

On the other hand, in the case where, in Step S904, it has not been determined that the waveform selection has been pressed, a determination is made as to whether the mode selection button has been pressed (Step S912).

Here, in the case where, in Step S912, it has been determined that the mode selection button has been pressed, in order to switch the current operating mode, "MODE=2 (manual reproduction mode)" is set if it is "MODE=1 (alternate reproduction mode)" and "MODE=1 (alternate reproduction mode)" is set if it is "MODE=2 (manual reproduction mode)" (Step S914).

After that, the waveform reproduction processing routine, which is a sub-routine of the main routine is executed (Step S916) and, when the waveform reproduction processing routine is completed, it returns to Step S904 and the processing is repeated.

On the other hand, in the case where, in Step S912, a determination has not been made as to whether the mode selection button has been pressed, the waveform reproduction processing routine is executed immediately (Step S916) and, when the waveform reproduction processing routine is completed, it returns to Step S904 and the processing is repeated.

Figure 10:
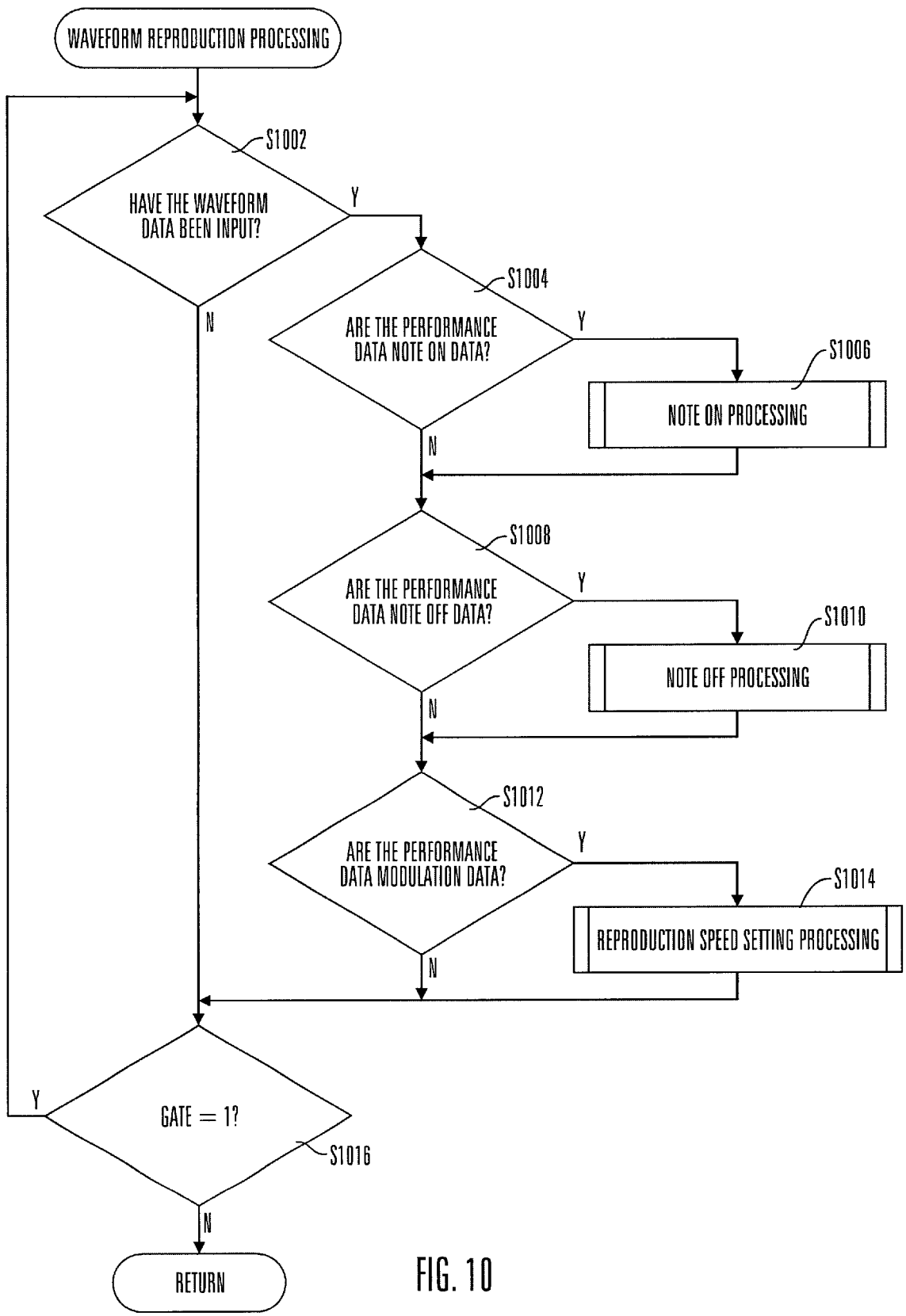
FIG. 10: A flowchart that shows the waveform reproduction processing routine.

Next, an explanation will be given regarding the waveform reproduction processing routine while referring to the flowchart of the waveform reproduction processing routine that is shown in FIG. 10.

In the waveform reproduction processing routine, first a determination is made as to whether performance data have been input from the keyboard (Step S1002) and, in the case where it has been determined that performance data have been input from the keyboard, it proceeds to Step S1016 after the processes of Step S1004 through Step S1014 have been executed. On the other hand, in the case where there has not been a determination that performance data have been input from the keyboard, it jumps to Step S1016 and advances.

To start, an explanation will be given regarding the processing of Step S1004 through Step S1014 in the case where it has been determined in Step S1002 that performance data have been input from the keyboard. In Step S1004 through Step S1014, the respective corresponding processes are carried out depending on the type of performance data.

In other words, first a determination is made as to whether the performance data are Note On data (Step S1004) and, in the case where a determination has been made that the performance data are Note On data, the Note On processing routine (FIG. 11), which is a sub-routine is executed (Step S1006).

On the other hand, in the case where it has not been determined in Step S1004 that the performance data are Note On data and also in the case where the execution of the Note On processing routine in Step S1006 has been completed, a determination is made as to whether the performance data are Note Off data (Step S1008).

Here, in the case where it has been determined that the performance data are Note Off data, the Note Off processing routine (FIG. 12), which is a sub-routine, is executed (S1010).

On the other hand, in those cases where a determination has not been made in Step S1008 that the performance data are Note Off data and, also, in the case where the execution of the Note Off processing routine in Step S1010 has been completed, a determination is made as to whether the performance data are modulation data (Step S1012).

Here, in the case where a determination has been made that the performance data are modulation data, the reproduction speed setting processing routine (FIG. 13), which is a sub-routine, is executed (Step S1014).

On the other hand, in the case where a determination has not been made in Step S1012 that the performance data are modulation data as well as in the case where the execution of the reproduction speed setting processing routine in Step S1014 has been completed, a determination is made as to whether "GATE=1" (Step S1016) and, in the case where it has been determined that "Gate=1," since the sound generation continues due to the Note On data, it returns to Step S1002 and the processing is repeated.

On the other hand, in the case where a determination has not been made in Step S1016 that "GATE=1," it returns to the main routine.

In addition, in the case where it has not been determined in Step S1002 that there has been an input of performance data from the keyboard, as discussed above, it jumps to Step S1016 and proceeds. In the case where a determination has been made that "GATE=1" in Step S1016, since the sound generation continues due to the Note On data, it returns to Step S1002 and the processing is repeated. On the other hand, in the case where a determination has not been made in Step S1016 that "GATE=1," it returns to the main routine.

Figure 11:
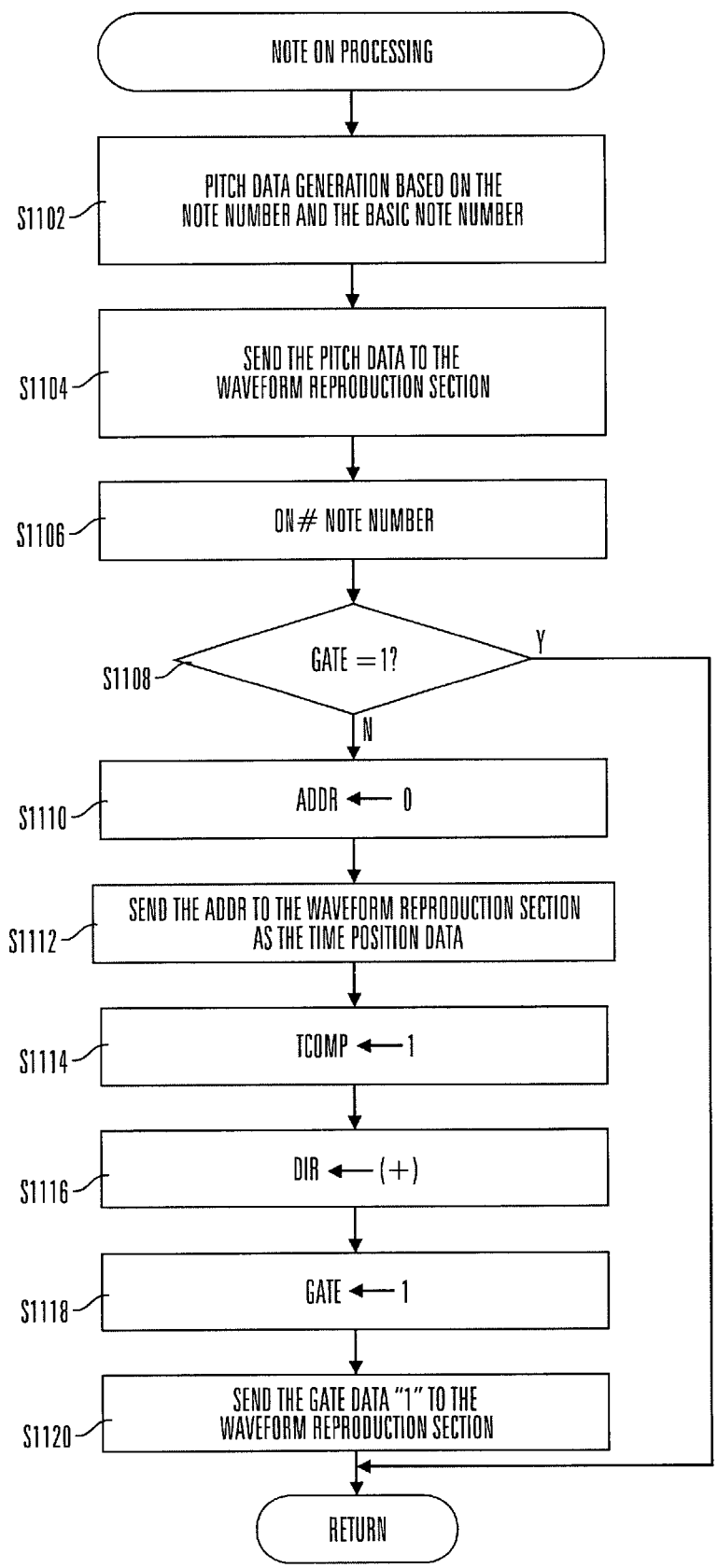
FIG. 11: A flowchart that shows the Note On processing routine.

Next, an explanation will be given regarding the Note On processing routine while referring to the flowchart of the Note On processing routine that is shown in FIG. 11.

In the Note On processing routine, first, the pitch data are generated based on the note number Num that indicates the Note On data and the basic note number Note # (Step S1102). Here the pitch data are expressed by $$\text{pitch data} = POW(2, (Num - Note\#)/12).$$

In order to understand this easily, the following definitions are made: "a=2" and "b=(Num−Note #)/12" and, if "POW (2,(Num−Note #)/12" is rewritten as "POW(a, b), then "POW(a, b) is expressed as a to the b power.

Next, the pitch data that have been generated are sent to the waveform reproduction section 24 (Step S1104).

Following that, the note number Num that indicates the note data are recorded and stored in the register ON # (Step S1106).

Next, a determination is made as to whether "GATE=1" and, in the case where it has been determined that "GATE=1," since the sound is already being generated by the Note On data, it returns to the waveform reproduction processing routine as it is without again carrying out the read-out of the waveform from the beginning.

On the other hand, in the case where a determination has not been made that "GATE=1," the sound generation start processing is done and the processing of Step S1110 through Step S1120 is executed.

In other words, the addr that indicates the time position of the waveform reproduction is made zero and it is set up so that the addr points to the beginning of the waveform data (Step S1110).

Next, the addr is sent to the waveform generating section 24 as time position data (Step S1112), 1 is set as the default value in tcomp (Step S1114), the reproduction direction dir is set as the forward direction (+) (Step S1116), GATE is set to "1" (Step S1118) and, after "1" is sent to the gate 248 of the waveform reproduction section 24 as the gate data (Step S1120), it returns to the waveform reproduction processing routine.

Incidentally, the waveform reproduction section 24 begins the sound generation due to the sending of "1" to the gate 248 of the waveform reproduction section 24 as the gate data.

Figure 12:
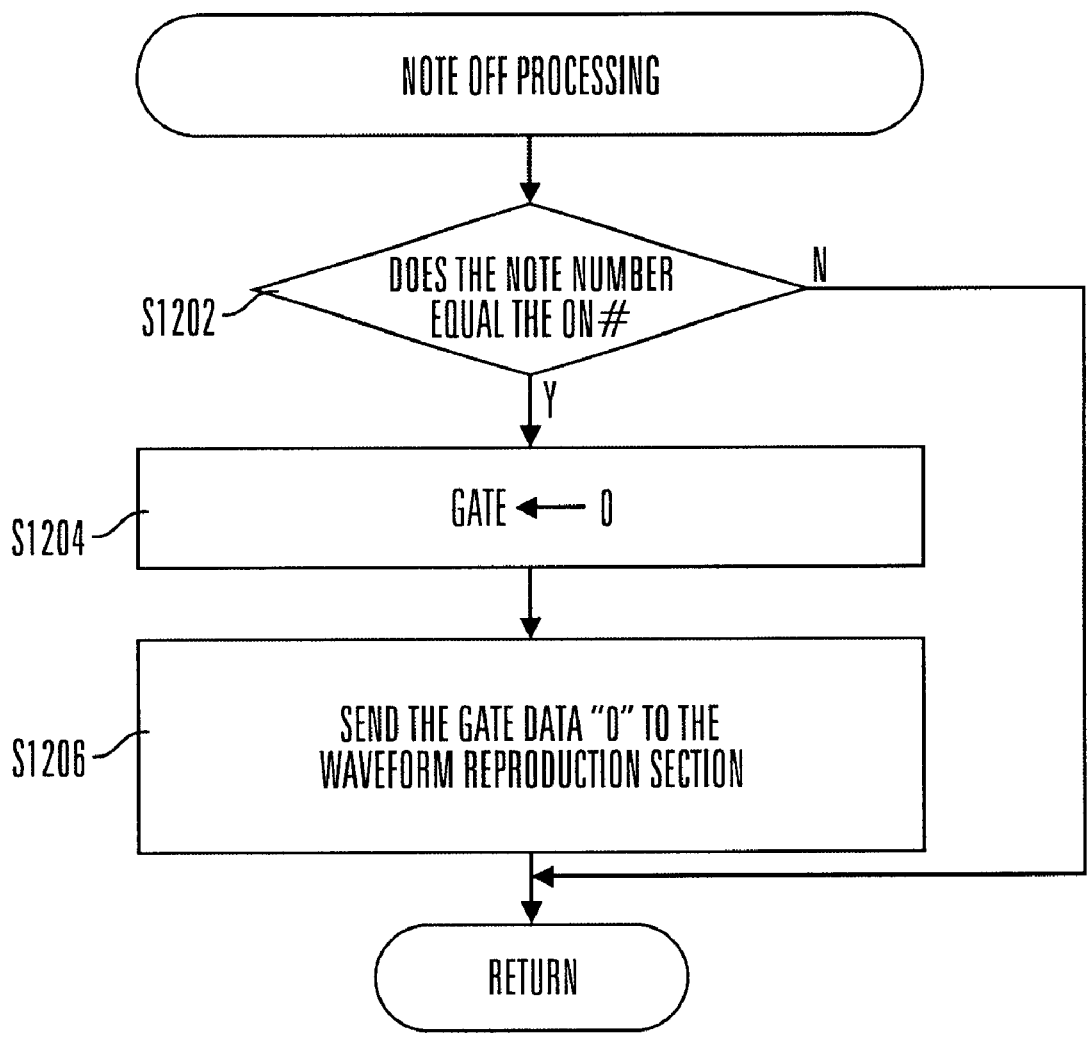
FIG. 12: A flowchart that shows the Note Off processing routine.

Next, an explanation will be given regarding the Note Off processing routine while referring to the flowchart of the Note Off processing routine that is shown in FIG. 12.

In the Note Off processing routine, first, a determination is made as to whether the note number of the Note Off data is equal to the note number that has been stored in ON # (Step S1202) and, in the case where it has not been determined that it is equal to that, it returns as it is to the waveform reproduction processing routine.

On the other hand, in the case where a determination has been made that the note number of the Note Off data is equal to the note number that has been stored in ON #, the sound generation termination processing in Step S1204 through Step S1206 is carried out.

In other words, after GATE is set to "0" (Step S1204) and the gate data of "0" are sent to the gate 248 of the waveform reproduction section 24 (Step S1206), it returns to the waveform reproduction processing routine.

Incidentally, the waveform reproduction section 24 terminates the sound generation due to the sending of "0" to the gate 248 of the waveform reproduction section 24 as the gate data.

Next, an explanation will be given regarding the reproduction speed setting processing routine while referring to the flowchart of the reproduction speed setting processing routine that is shown in FIG. 13.

In the reproduction speed setting routine, first, a determination is made as to whether "MODE=1 (alternate reproduction mode)" or "MODE=2 (manual reproduction mode)" (Step 1302).

Here, in the case where a determination has been made that "MODE=1 (alternate reproduction mode)," the value of tcomp, which indicates the speed of the waveform reproduction, is set in the range of "tcomp=+(½) to tcomp=+2" to the proportional allocation that corresponds to the amount of operation of the modulation lever in the range of "position b1 to the maximum front position Max f" (Step S1304) and it returns to the waveform reproduction processing routine.

On the other hand, in the case where a determination has been made that "MODE=2 (manual reproduction mode)," the value of tcomp, which indicates the speed of the waveform reproduction, is set in the range of "tcomp=−2 to tcomp+2" to the proportional allocation that corresponds to the amount of operation of the modulation lever in the range of "the maximum back position Max b to the maximum front position Max f" (Step S1304) and it returns to the waveform reproduction processing routine.

Next, an explanation will be given regarding the insertion processing routine while referring to the flowchart of the insertion processing routine that is shown in FIG. 14. The insertion processing routine is a routine which is executed each time the CPU receives a clock signal from the clock generator 18, in other words, for each clock.

In the insertion routine that is carried out in this manner, first, processing is carried out in which the addr is sent to the time and frequency conversion processing section 244 of the waveform reproduction section 24 as the time position data (Step S1402).

Next, a determination is made as to whether "MODE=1 (alternate reproduction mode)" or "MODE=2 (manual reproduction mode)" (Step S1404).

Here, in the case where it has been determined that "MODE=1 (alternate reproduction mode)," the control of the address advance in the alternate reproduction mode is executed in Step S1406 through Step S1422.

Specifically, first, a determination is made as to whether the reproduction direction dir is the forward direction (+) or the reverse direction (−) (Step S1406).

Here, in the case where it has been determined that the reproduction direction dir is the forward direction (+), tcomp is added to addr, updating addr (Step S1408) and a determination is made as to whether the updated addr is Alt E or greater (Step S1410).

In the case where it has been determined in Step S1410 that the updated addr is Alt E or greater, the value of Alt E is set to addr (Step S1412), the reproduction direction dir is set to the reverse direction (−) (Step S1414) and it advances to Step S1426.

On the other hand, in the case where it has not been determined in Step S1410 that the updated addr is Alt E or greater, it jumps and advances to Step S1426.

Accordingly, in the case where, due to the processing of Step S1408 through Step S1410, the addr that indicates the time position is added with each tcomp, the waveform reproduction is carried out in the forward direction, in other words, following the temporal order of the waveform data, and it has reached the reproduction point that indicates the value of the alternate ending point data Alt E, the next time, the waveform reproduction is carried out in the reverse direction from the reproduction point that indicates the value of the alternate ending point data Alt E, in other words, the opposite of the temporal order so that it retraces the passage of time of the waveform data.

In addition, in the case where it has been determined in Step S1406 that the reproduction direction dir is the reverse direction (−), tcomp is subtracted from addr, updating addr (Step S1416) and a determination is made as to whether the updated addr is less than Alt E (Step S1418).

In the case where it has been determined in Step S1418 that the updated addr is less than Alt E, the value of Alt S is set to addr (Step S1420), the reproduction direction dir is set to the forward direction (+) (Step S1422) and it advances to Step S1426.

On the other hand, in the case where it has not been determined in Step S1418 that the updated addr is less than Alt E, it jumps and advances to Step S1426.

Accordingly, in the case where, due to the processing of Step S1416 through Step S1422, the addr that indicates the time position is subtracted with each tcomp, the waveform reproduction is carried out in the reverse direction, in other words, the opposite of the temporal order so that it retraces the passage of time of the waveform data, and it has reached the reproduction point that indicates the value of the alternate starting point data Alt S, the next time, the waveform reproduction is carried out in the forward direction from the reproduction point that indicates the value of the alternate starting point data Alt S, in other words, following the temporal order of the waveform data.

That is to say, due to the processing of Step S1406 through S1422, the time position of the waveform reproduction is changed so that the waveform is reproduced in the "Alt S-Alt E-Alt S-Alt E- . . . " direction. In other words, the reproduction position of the waveform is changed so that the reproduction of the waveform is carried out reciprocating in the segment that is between the reproduction position that indicates the value of the alternate starting point data Alt S and the reproduction position that indicates the value of the alternate ending point data Alt E and the reproduction position of the waveform is made to "swing."

Because of this, the instantaneous frequency, in other words, the reproduction pitch, changes smoothly cyclically so that it is possible to achieve a vibrato reproduction that gives full play to the key elements of the vibrato that are possessed by the original waveform and the compression and expansion of a waveform that is full of elegance and has an abundance of changes can be carried out.

In addition, in the case where it has been determined in Step S1404 that "MODE=2 (manual reproduction mode)," tcomp is added to addr and the advance control in the manual reproduction mode is executed (Step S1424). Then it advances to Step S1426.

Accordingly, in the manual reproduction mode, the addr is advanced to conform to the value of tcomp that has been set in the range of "tcomp=−2 to tcomp=+2" by the operation of the modulation lever.

Specifically, in the case where the value of tcom is set in the range of "0<tcomp<+2," the addr that indicates the time position is increased with each tcomp and the reproduction of the waveform is carried out in the forward direction, in other words, following the temporal order of the waveform data.

Then, since in the case where the value of tcomp is "tcomp=0," the addr does not advance, the reproduction position at the time of the reproduction of the waveform does not change and the audio continues without changing during the sound generation.

In addition, in the case where the value of tcomp has been set in the range of "−2<tcomp<0," the addr that indicates the time position is decreased with each absolute value of tcomp and the reproduction of the waveform is carried out in the reverse direction, in other words, opposite the time order, so that the passage of time of the waveform data is retraced. Because of this, it is possible to obtain a special musical effect in which there are such things as the reproduction of an attenuated sound in the reverse direction, in other words, the reproduction is done so that it gradually becomes audio having little attenuation from audio that is greatly attenuated at the time of the reproduction of the attenuated sound.

In Step S1426, a determination is made as to whether the addr is Wave End or greater and, in the case where it has been determined that the addr is Wave End or greater, in other words, the reproduction position of the waveform has reached the position that indicates the value of the waveform end data Wave End, the addr is set to Wave End (Step S1428) while, together with this, the gate data of "0" are sent to the waveform reproduction section 24 (Step S1430). Incidentally, the sound generation in the waveform reproduction section 24 is terminated by the sending of the "0" to the waveform reproduction section 24 as the gate data.

On the other hand, in the case where it has been determined in Step S1426 that the addr is not Wave End or greater, in other words, that the reproduction of the waveform has not reached the position that indicates the value of the waveform end data Wave End, as well as the case where the processing of Step S1430 has terminated, a determination is made as to whether the addr is less than 0 (Step 1432) and, in the case where it has been determined that the addr is less than 0, in other words, that addr has become smaller than 0, a correction is made to the addr setting the addr to 0 (Step S1432) and it returns to the main routine.

On the other hand, in the case where it has been determined in Step S1432 that the addr is not less than 0, in other words, that the addr is not smaller than 0, it returns to the main routine as it is unchanged.

Accordingly, in accordance with this waveform reproduction apparatus, in the case where the operating mode is the alternate reproduction mode, the time position of the waveform reproduction is changed so that the waveform is reproduced in the "Alt S-Alt E-Alt S-Alt E- . . . " direction and the reproduction point of the waveform "swings." In addition, in the case where the operating mode is the manual reproduction mode, the reproduction of the waveform is carried out with the value of tcomp set in the range of "−2<tcomp<0" and the reproduction point of the waveform is advanced in the reverse direction.

Because of this, with both the alternate reproduction mode and manual reproduction mode, the compression and expansion of a waveform that is full of elegance and has an abundance of changes can be carried out.

2. Description of the Second Preferred Embodiment

Next, an explanation will be given regarding the second preferred embodiment in accordance with the present invention while referring to FIG. 15 through FIG. 19.

Figure 3:
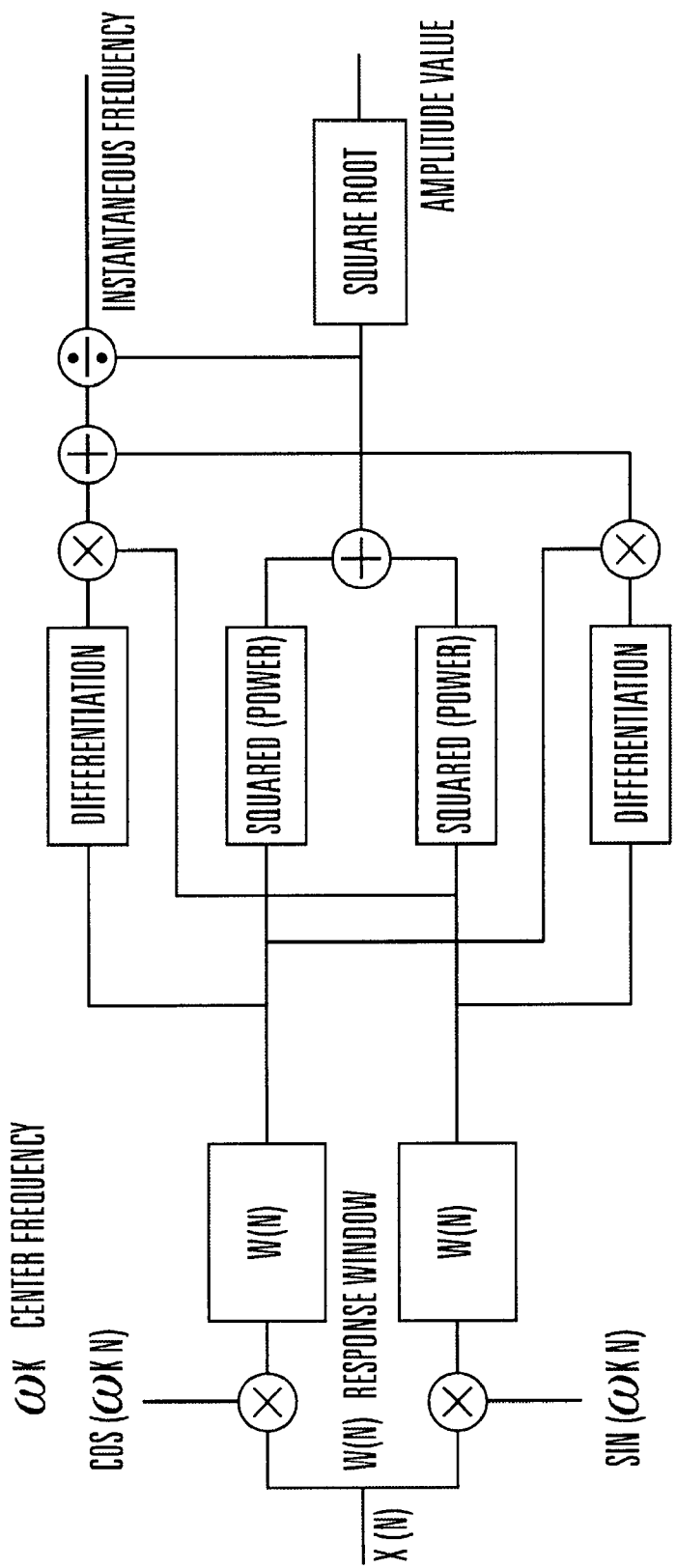
FIG. 3: A block structural diagram of a detailed illustration of the analysis section (band k analysis section) of the band k that is in the phase vocoder that is shown in FIG. 2.
Figure 4:
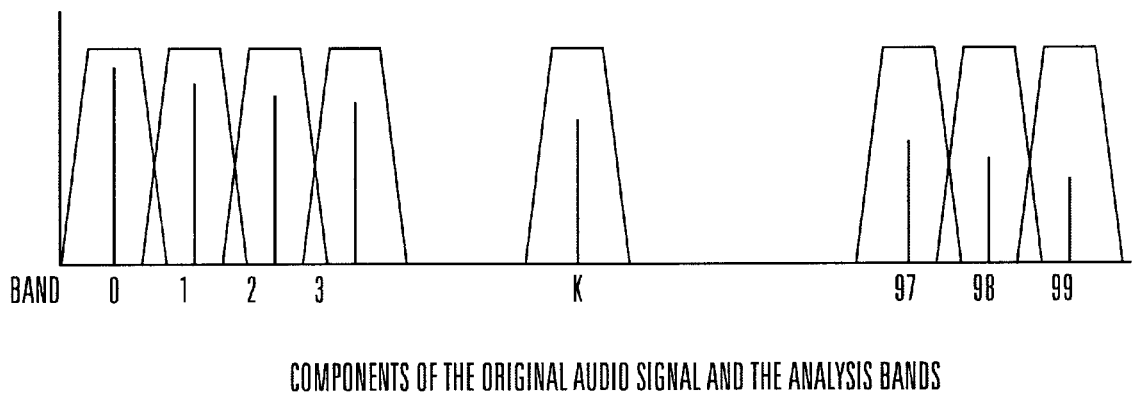
FIG. 4: An explanatory diagram that shows the state of a frequency band that has been divided into 100 bands from band 0 to band 99.
Figure 15:
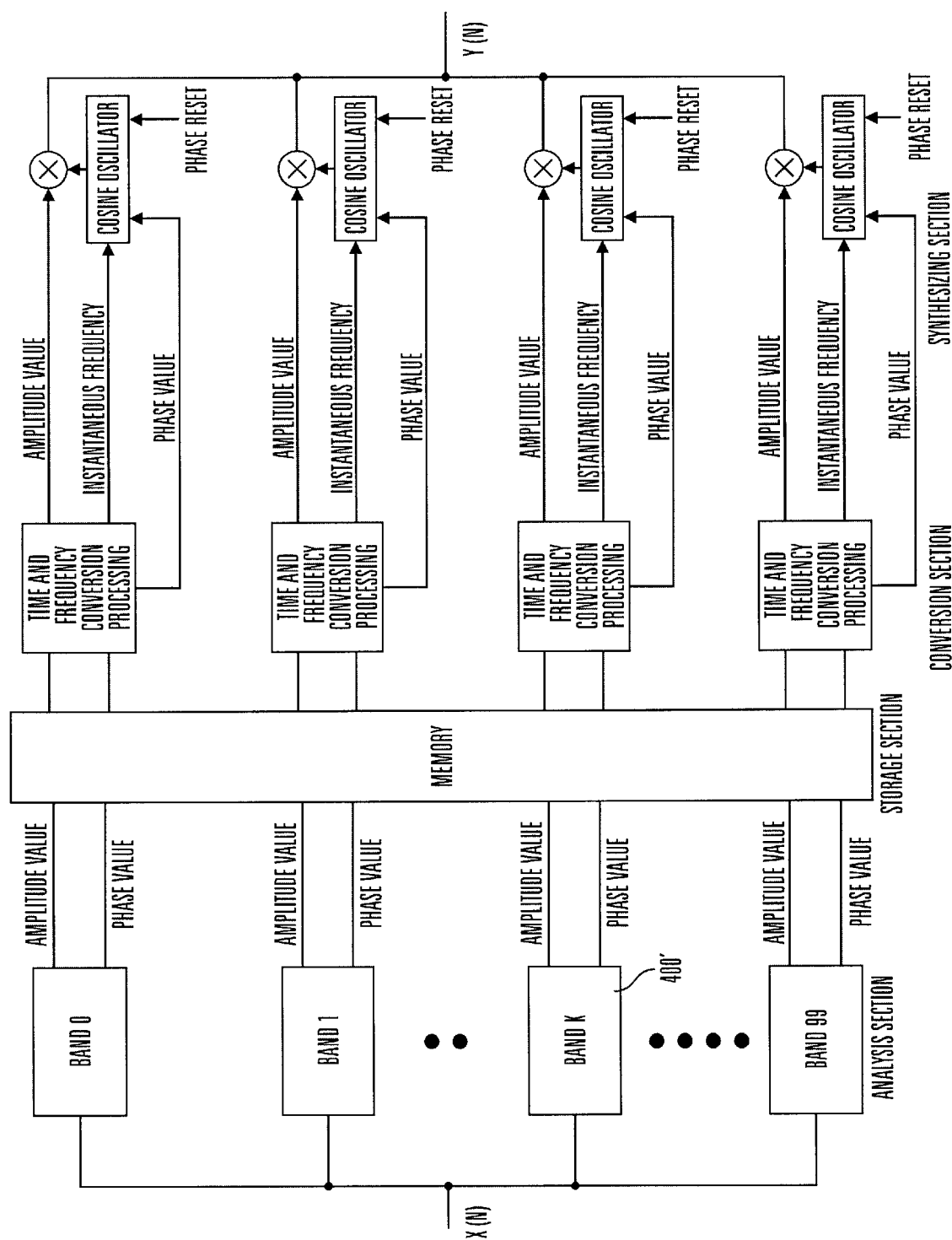
FIG. 15: A block structural diagram which shows the phase vocoder that is employed in the second preferred embodiment of the waveform reproduction apparatus in accordance with the present invention which corresponds to FIG. 2.
Figure 16:
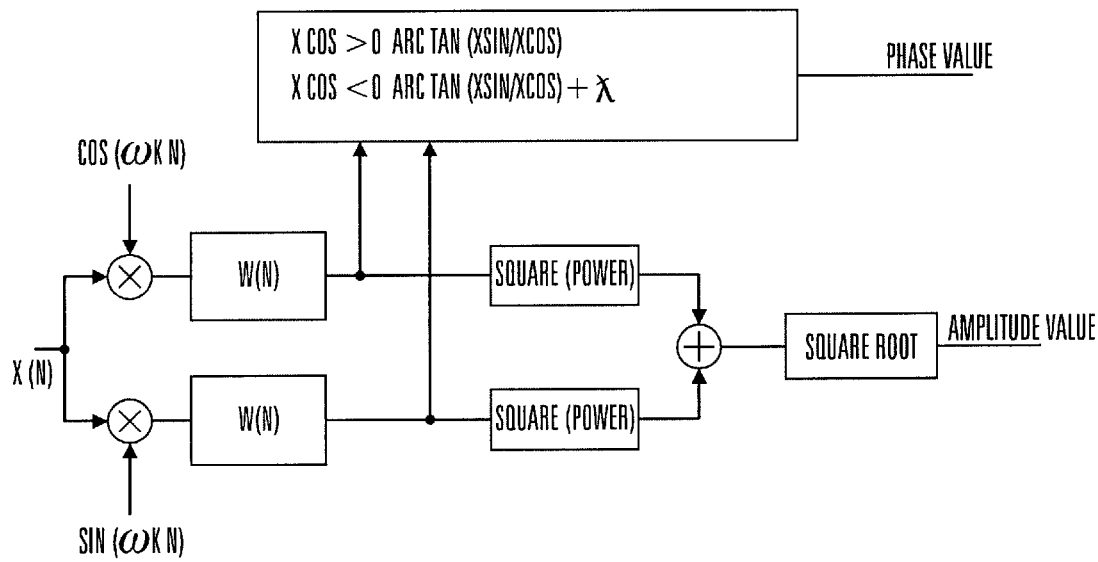
FIG. 16: A block structural diagram which shows one example of the detailed structure of the analysis section for band k (the band k analysis section) in the phase vocoder that is shown in FIG. 15 which corresponds to the above mentioned FIG. 3.
Figure 17:
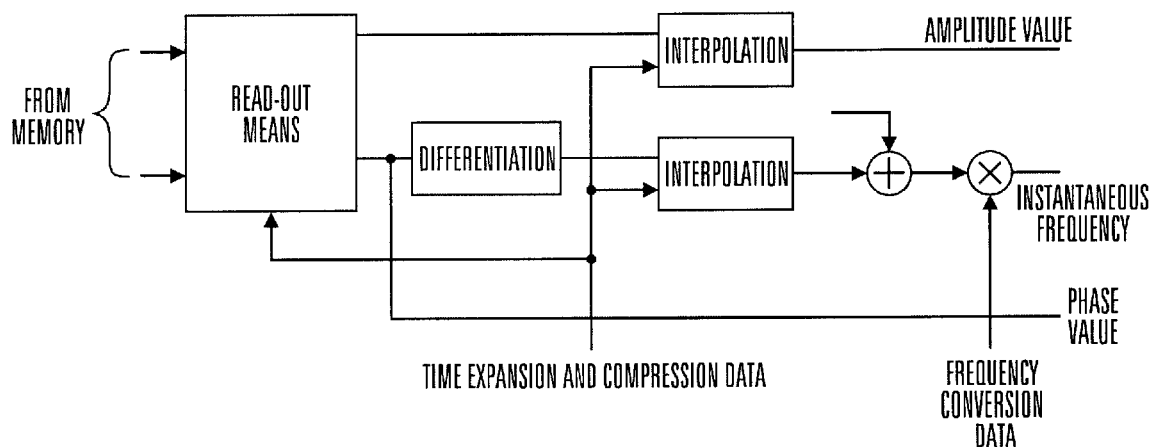
FIG. 17: A block structural diagram that shows one example of the detailed structure of the band k conversion section for the execution of the time and frequency conversion processing for band k in the phase vocoder that is shown in FIG. 15 which corresponds to FIG. 5(a).
Figure 18:
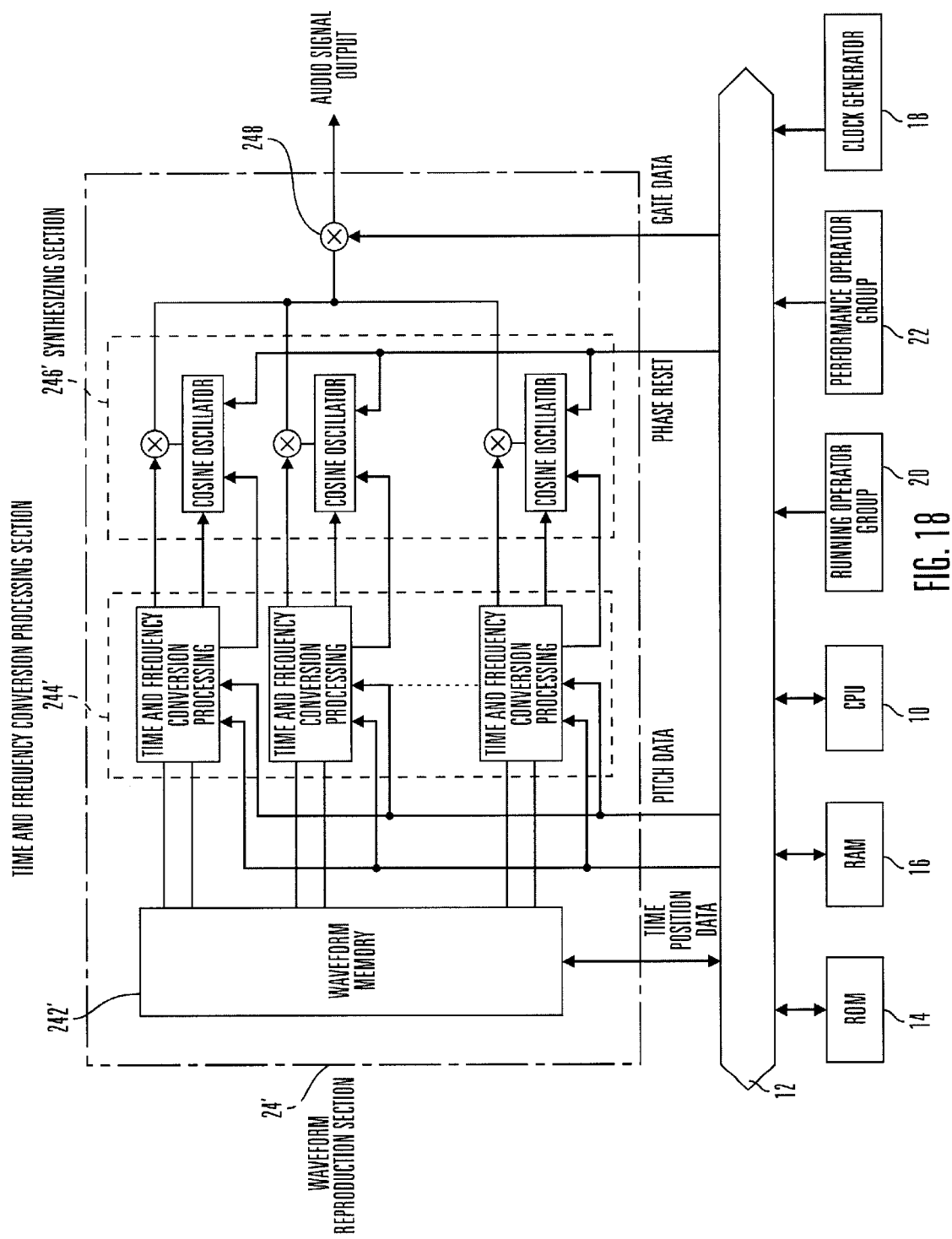
FIG. 18: A block structural diagram of the hardware for the achievement of one example of the second preferred embodiment of the waveform reproduction apparatus in accordance with the present invention which corresponds to FIG. 6.
Figure 19:
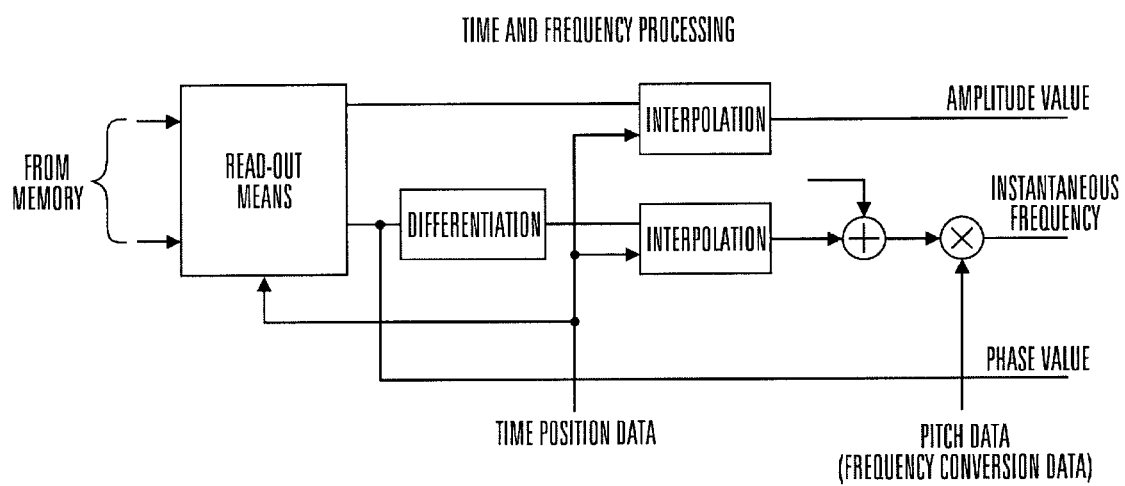
FIG. 19: A block structural diagram that shows one example of the detailed structure of the time and frequency conversion processing section in the waveform reproduction apparatus that is shown in FIG. 18 which corresponds to the above mentioned FIG. 17.

Incidentally, FIG. 15 is a block structural diagram which shows the phase vocoder that is employed in the second preferred embodiment of the waveform reproduction apparatus in accordance with the present invention (FIG. 15 corresponds to the above mentioned FIG. 2), FIG. 16 is a block structural diagram which shows one example of the detailed structure of the analysis section for band k (the band k analysis section) in the phase vocoder that is shown in FIG. 15 (FIG. 15 corresponds to the above mentioned FIG. 3), FIG. 17 is a block structural diagram that shows one example of the detailed structure of the band k conversion section for the execution of the time and frequency conversion processing for band k in the phase vocoder that is shown in FIG. 15 (FIG. 17 corresponds to the above mentioned FIG. 5(a)), FIG. 18 is a block structural diagram of the hardware for the achievement of one example of the second preferred embodiment of the waveform reproduction apparatus in accordance with the present invention (FIG. 18 corresponds to the above mentioned FIG. 6), FIG. 19 is a block structural diagram that shows one example of the detailed structure of the time and frequency conversion processing section in the waveform reproduction apparatus that is shown in FIG. 18 (FIG. 19 corresponds to the above mentioned FIG. 17).

In addition, with regard to the structures in FIG. 15 through FIG. 19 that are identical to or equivalent to the structures that are shown in FIG. 1 through FIG. 14, due to the fact that the identical key numbers are used and shown as the key numbers that are used in FIG. 1 through FIG. 14, the descriptions of their detailed structures and action have been omitted and, in the following description, an explanation is given only regarding the areas where there are differences with the structures and actions that are shown in FIG. 1 through FIG. 14.

In addition, with regard to the phase vocoder that is shown in FIG. 1 through FIG. 14 and the phase vocoder that is shown in FIG. 15 through 19 (hereafter referred to as the "absolute phase vocoder" as the circumstances warrant), in contrast to the storage of the instantaneous frequency data and the amplitude data that are shown in FIG. 1 through FIG. 14, the absolute phase vocoder differs in that the phase value is stored as the data instead of the instantaneous frequency data and the fact that the phase value data from the difference (differential) at the time of the waveform synthesis are converted in to the instantaneous frequency data and used.

In other words, in the absolute phase vocoder, the analysis section (the band k analysis section) 400', which is the section that produces the data on the encoding side, is set up so that it produces the phase value and, in addition, the configuration is established for the conversion of the phase into a frequency in the conversion section that carries out the time and frequency conversion processing on the decoding side. Furthermore, it is set up so that the processing is done with the cosine oscillator receiving the phase reset signal for the resetting (initialization) of the phase.

That is to say, in the absolute phase vocoder, as is shown in FIG. 16, it is set up so that the phase value data and the amplitude value data are output by the analysis section 400' and the storage section stores the phase value data and the amplitude value data that have been output in this way (in the storage section of the phase vocoder that is shown in FIG. 1 through FIG. 14, the instantaneous frequency data and the amplitude value data are stored).

Then, as is shown in FIG. 17, the phase value data that have been output by the storage section are differentiated by the time and frequency conversion processing and converted into the instantaneous frequency data.

In addition, when the phase reset signal is sent to the cosine oscillator at the time of the start of signal generation, processing is carried out in which the phase that is stored in the cosine oscillator is reset, phase data that are sent directly from the memory are acquired and rewriting is done with the value that has had the portion of the rotation of the center frequency ωk added.

Incidentally, the phase reset signal is sent to the cosine oscillator one time only at the time of the start of reproduction.

In this manner, with the absolute phase vocoder, the phase reset signal is sent to the cosine oscillator at the time of the start of reproduction and the initial phase is acquired by the cosine oscillator. Accordingly even if the reproduction proceeds with a one-to-one reproduction, the phase of the cosine oscillator is preserved as a phase that is the same as that of the original sound.

Incidentally, since the cosine oscillator can acquire the phase value to correspond to the instant at the start of reproduction, reproduction using this absolute phase vocoder is not limited to reproduction from the beginning of the waveform and it is possible to also use it for reproduction from the middle of the sample.

In this manner, the absolute phase vocoder is one with which a waveform can be reproduced that possesses a phase that is exactly the same as that of the original sound no matter whether the reproduction is from the beginning or from the middle.

Accordingly, by means of this absolute phase vocoder, the original sound is faithfully reproduced without the production of tone quality degradation in contrast to the phase vocoder that is shown in FIG. 1 through FIG. 14 with which, due to the phase difference with that of the original sound at the time of a one-to-one reproduction, the original sound cannot be faithfully reproduced and, because of that, some degradation of the tone quality is produced.

In addition, by means of this absolute phase vocoder, since the phase is the same as that of the original sound, it is possible to accurately preserve the orientation of a stereo signal at the time of reproduction in contrast to the phase vocoder that is shown in FIG. 1 through FIG. 14 with which, because the phase at the time of reproduction is different from that of the original sound, the orientation of the stereo signal disappears.

Thus, in the one example of the second preferred embodiment of the waveform reproduction apparatus in accordance with the present invention that is shown in FIG. 18, the above mentioned absolute phase vocoder is employed in the waveform reproduction section 24'.

In other words, in the waveform memory 242' of the waveform reproduction section 24', the phase value data and the amplitude vale data that have been obtained from the analysis section that is shown in FIG. 16 are stored.

In addition, the processing that is shown in FIG. 19 is carried out as the time and frequency conversion processing of the time and frequency conversion processing section 244' of the waveform reproduction section 24'.

That is to say, the time and frequency conversion processing section 244' is equivalent to the conversion section of the absolute phase vocoder that is shown in FIG. 15 and this carries out the time conversion and pitch conversion for each frequency band. For each frequency band, the time and frequency conversion processing section 244' is synchronized with the clock signal that is generated by the clock generator 18, the waveform data are read out from the waveform memory 242' in accordance with the time position data from the CPU 10 for each clock and the amplitude data, the time position data and the instantaneous frequency data of the waveform data (the phase value data are differentiated, said phase value data are converted into the instantaneous frequency data and used) are sent to the synthesizing section 246'. Incidentally, the instantaneous frequency data are added to the center frequency of the frequency band, the pitch data from the CPU 10 are then multiplied with the result of said addition as the frequency conversion rate and sent to the synthesizing section following conversion as the instantaneous frequency data (refer to FIG. 19).

In addition, the synthesizing section 246' is equivalent to the synthesizing section of the absolute phase vocoder that is shown in FIG. 15. The waveforms for each frequency band are generated from the respective amplitude data and instantaneous frequency data for each frequency band, the waveforms of each frequency band are all added and the audio signal is output. At this time, the cosine oscillator outputs a sine wave at the frequency that corresponds to the instantaneous frequency data and the amplitude of said sine wave is controlled by the amplitude data. In addition, a phase reset signal is supplied to the cosine oscillator at the time that the sound generation is begun and, when the phase reset signal is supplied to the cosine oscillator, the cosine oscillator resets the phase that has been stored, the phase value that is read out from the waveform memory 242' is set at the time that the sound generation is begun and the cosine oscillator generates a cosine signal from the phase value that has been set.

Incidentally, in the second preferred embodiment of the waveform reproduction apparatus in accordance with the present invention that is shown in FIG. 18, the waveform data that are stored in the RAM 16 are made up of the amplitude data which are data that express the shift in the amplitude of the waveform together with the passage of time and the phase value data which are data that express the phase of the waveform. They are expressed as follows.

| | |
|---|---|
| Band 0 amplitude data | Amp (0, addr) |
| Band 0 phase value data | Phas (0, addr) |
| Band 1 amplitude data | Amp (1,addr) |
| Band 1 phase value data | Phas (1, addr) |
| Band k amplitude data | Amp (k, addr) |
| Band k phase value data | Phas (k, addr) |
| Band 99 amplitude data | Amp (99, addr) |
| Band 99 phase value data | Phas (99, addr) |

Next, regarding one example of the second preferred embodiment of the waveform reproduction apparatus in accordance with the present invention that is shown in FIG. 18 and regarding an explanation other than the above mentioned explanation that has been made concerning the absolute phase vocoder, since it is the same as the explanation that corresponds to the one that was given while referring to FIG. 1 through FIG. 14, it will be omitted. However, regarding the processing of Step S1112 of the flowchart that shows the Note On processing routine that is shown in FIG. 11, the reading is substituted with, "Together with the output of addr as the time position data in the waveform reproduction section 24, a phase reset signal is sent to the waveform reproduction section 24."

Advantageous Result of the Invention

Since the present invention is configured in the manner that was described above, it demonstrates a superior efficacy in which the smooth compression and expansion of the audio signal is possible without directly culling out or repeating a prescribed segment of the audio signal, in other words, the waveform, by the use of a phase vocoder format and, together with this, it becomes possible to compress and expand an audio signal that is full of elegance and has an abundance of changes with, for example, reproduction in the reverse direction of the passage of time on the temporal axis or reproduction while changing the direction of reproduction position to the forward direction and the reverse direction.

In addition, since the present invention is configured in the manner that was described above, it demonstrates a superior efficacy in which, in the case where one-to-one reproduction is carried out, it is possible to faithfully reproduce the original sound.

What is claimed is:

1. A waveform reproduction apparatus having:
a storage means in which the data regarding the changes in the amplitude and the frequency of the waveform that accompany the passage of time are stored;
a time position data generating means in which the time position data that indicate the time positions that change such that the time positions of the waveform retrace the passage of time are generated in order; and
a waveform reproduction means in which, from the previously mentioned storage means, the amplitude and the frequency data that correspond to the time position of the waveform that indicates the time position data that are generated by the previously mentioned time position data generating means are read out and a waveform that is based on said read out amplitude and frequency is output.

2. In the waveform reproduction apparatus cited in claim 1, the waveform reproduction apparatus has, in addition:
a setting means in which the changing speed is set such that the time positions that are indicated by the time position data that are generated by the previously mentioned time position data generating means retrace the passage of time.

3. A waveform reproduction apparatus having:
a storage means in which the data regarding the changes in the amplitude and the frequency of the waveform that accompany the passage of time are stored;
a time position data generating means in which the time position data that indicate the time positions of the waveform are generated in order,
a waveform reproduction means in which, from the previously mentioned storage means, the amplitude and the frequency data that correspond to the time position of the waveform that indicates the time position data that are generated by the previously mentioned time position data generating means are read out and a waveform that is based on said read out amplitude and frequency is output; and
a control means which is a control means that controls the changing of the time position data that are generated by the previously mentioned time position data generating means and with which said time position data are changed such that they swing within a prescribed range.

4. In the waveform reproduction apparatus cited in claim 3, the waveform reproduction apparatus is one in which:
the previously mentioned storage means stores the segment data that indicate the temporal segment of the waveform; and
the previously mentioned control means is one in which the shifting of the time position data temporally in the forward direction and in the reverse direction is repeated in the segment that is indicated by the segment data that have been stored in the previously mentioned storage means.

5. A waveform reproduction apparatus having:
a storage means in which the data regarding the changes in the amplitude and the phase of the waveform that accompany the passage of time are stored;
a time position data generating means in which the time position data that indicate the time positions that change such that the time positions of the waveform retrace the passage of time are generated in order; and
a waveform reproduction means in which, from the previously mentioned storage means, the amplitude and the phase data that correspond to the time position of the waveform that indicates the time position data that are generated by the previously mentioned time position data generating means are read out and a waveform that is based on said read out amplitude and phase is output.

6. In the waveform reproduction apparatus cited in claim 5, the waveform reproduction apparatus has, in addition;
a setting means in which the changing speed is set such that the time positions that are indicated by the time position data that are generated by the previously mentioned time position data generating means retrace the passage of time.

7. A waveform reproduction apparatus having:
a storage means in which the data regarding the changes in the amplitude and the phase of the waveform that accompany the passage of time are stored;

a time position data generating means in which the time position data that indicate the time positions of the waveform are generated in order;

a waveform reproduction means in which, from the previously mentioned storage means, the amplitude and the phase data that correspond to the time position of the waveform that indicates the time position data that are generated by the previously mentioned time position data generating means are read out and a waveform that is based on said read out amplitude and phase is output; and a control means which is a control means that controls the changing of the time position data that are generated by the previously mentioned time position data generating means and with which said time position data are changed such that they swing within a prescribed range.

8. In the waveform reproduction apparatus cited in claim 7, the waveform reproduction apparatus is one in which:

the previously mentioned storage means stores the segment data that indicate the temporal segment of the waveform; and the previously mentioned control means is one in which the shifting of the time position data temporally in the forward direction and in the reverse direction is repeated in the segment that is indicated by the segment data that have been stored in the previously mentioned storage means.

* * * * *